United States Patent
Emaru et al.

(10) Patent No.: US 12,475,038 B2
(45) Date of Patent: Nov. 18, 2025

(54) STORAGE SYSTEM AND INFORMATION PROCESSING SYSTEM FOR MANAGING STORED DATA

(71) Applicant: Kioxia Corporation, Tokyo (JP)

(72) Inventors: Michiko Emaru, Tokyo (JP); Koji Maruya, Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/606,243

(22) Filed: Mar. 15, 2024

(65) Prior Publication Data
US 2024/0320145 A1    Sep. 26, 2024

(30) Foreign Application Priority Data
Mar. 23, 2023  (JP) .................................. 2023-046891

(51) Int. Cl.
  *G06F 12/02*   (2006.01)
(52) U.S. Cl.
  CPC .............................. *G06F 12/0246* (2013.01)
(58) Field of Classification Search
  CPC .... G06F 12/0246; G06F 3/064; G06F 3/0679; G06F 3/0688; G06F 11/1068; G06F 2212/7207
  USPC .......................... 711/103, E12.008, 154, 102
  See application file for complete search history.

(56) References Cited

U.S. PATENT DOCUMENTS

| | | | |
|---|---|---|---|
| 8,014,573 B2 | 9/2011 | Boomer et al. | |
| 10,133,917 B2 | 11/2018 | Enomoto et al. | |
| 2007/0022112 A1 | 1/2007 | Asukai et al. | |
| 2014/0240335 A1* | 8/2014 | Hu ...................... | G06F 12/0871 345/543 |
| 2019/0146920 A1* | 5/2019 | Hua .................... | G06F 12/0891 711/141 |
| 2019/0377512 A1* | 12/2019 | Hodes .................. | G06F 3/0679 |
| 2021/0174971 A1 | 6/2021 | Jain et al. | |
| 2022/0100665 A1* | 3/2022 | Kotra ..................... | G06F 9/383 |

FOREIGN PATENT DOCUMENTS

| | | |
|---|---|---|
| JP | 2007-26133 A | 2/2007 |
| JP | 2021-89465 A | 6/2021 |
| JP | 2021-100231 A | 7/2021 |

* cited by examiner

*Primary Examiner* — Jared I Rutz
*Assistant Examiner* — Edward Waddy, Jr.
(74) *Attorney, Agent, or Firm* — Maier & Maier, PLLC

(57) ABSTRACT

According to one embodiment, a controller, when a first possible storage period corresponding to a first data portion among one or more data portions is equal to or more than a first threshold in one or more possible storage periods, writes the first data portion to one or more second blocks different from one or more first blocks and invalidate the first data portion stored in the one or more first block. When the first possible storage period is less than the first threshold and a period for which the first data portion is stored in the one or more first blocks has reached the first possible storage period, invalidates the first data portion stored in the one or more first blocks.

20 Claims, 13 Drawing Sheets

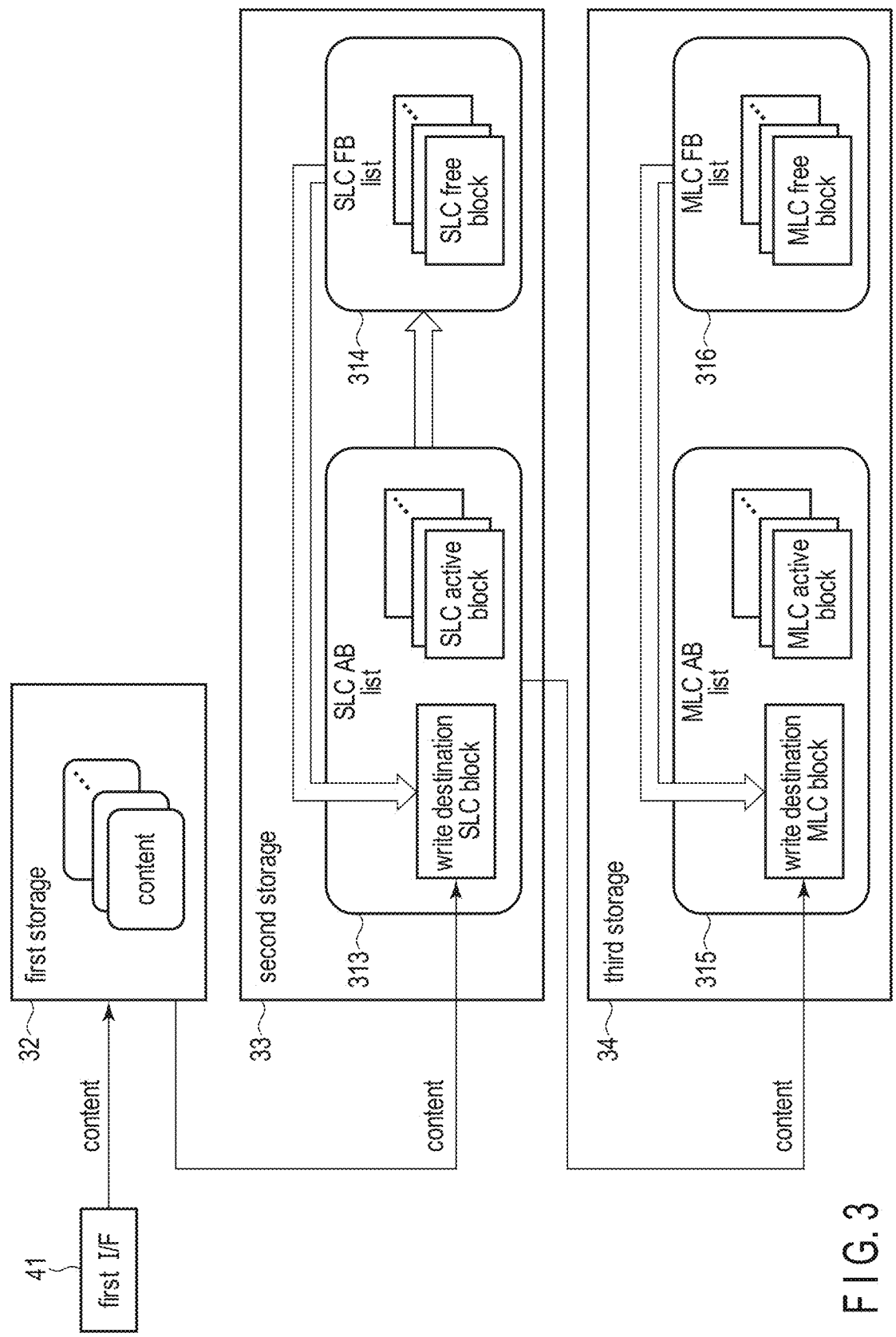
F I G. 3

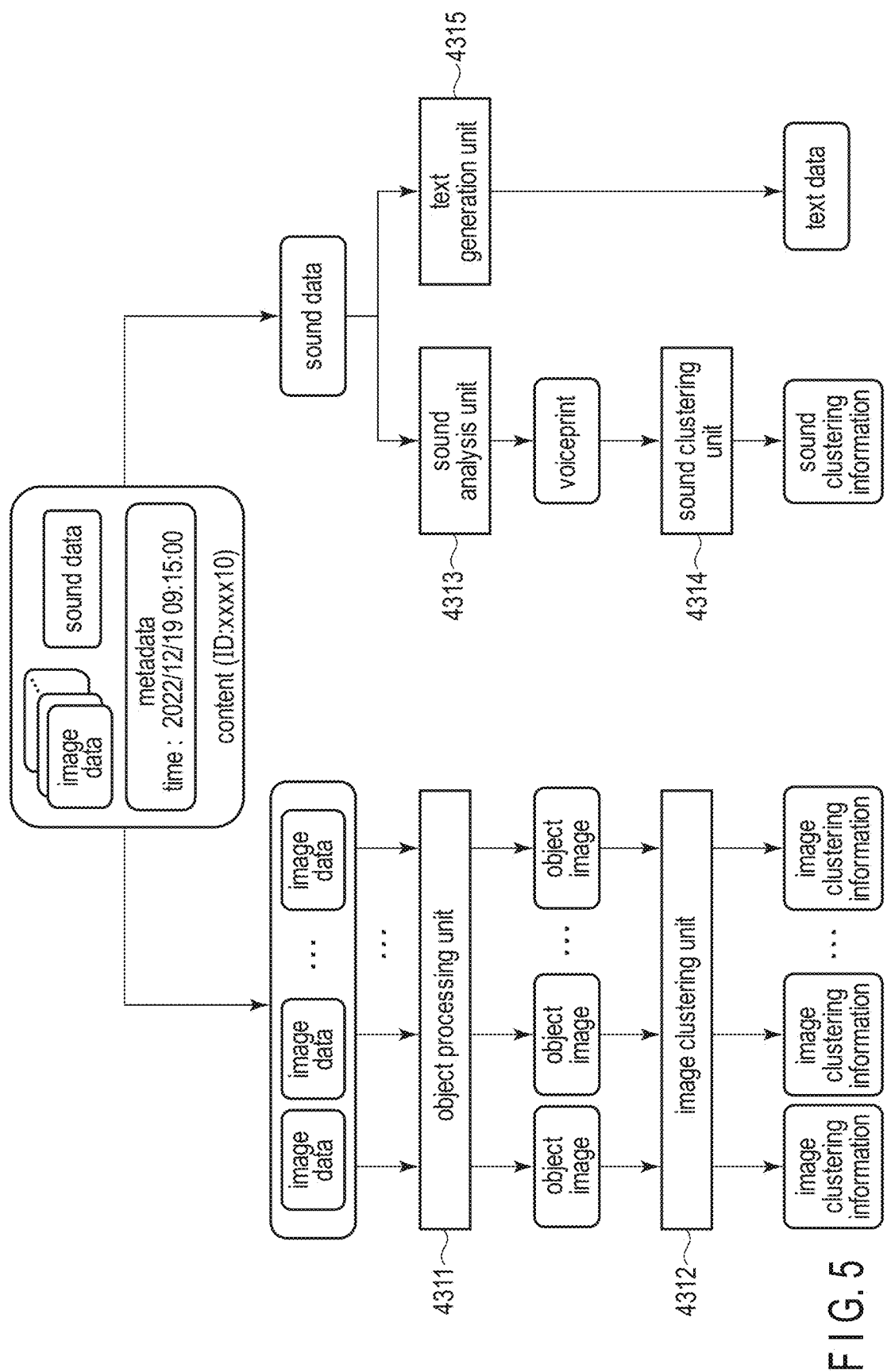
F I G. 5

| ID | possible storage period | storage time limit | status |
|---|---|---|---|
| xxxx10 | t_keep_total_10 (<t_long:less than threshold) | T_limit_10 (≤T_current:reached) | invalid |
| xxxx20 | t_keep_total_20 (<t_long:less than threshold) | T_limit_20 (>T_current:not reached) | continuance |
| xxxx30 | t_keep_total_30 (≥t_long:equal to or longer than threshold) | T_limit_30 (>T_current:not reached) | to be moved |
| ... | ... | ... | ... |

FIG. 10

STORAGE SYSTEM AND INFORMATION PROCESSING SYSTEM FOR MANAGING STORED DATA

CROSS-REFERENCE TO RELATED APPLICATIONS

This application is based upon and claims the benefit of priority from Japanese Patent Application No. 2023-046891, filed Mar. 23, 2023, the entire contents of which are incorporated herein by reference.

FIELD

Embodiments described herein relate generally to a storage system and an information processing system.

BACKGROUND

In recent years, in order to assist memory of a user, an information processing system that records life data of the user has been developed. The life data includes, for example, data regarding the life of the user, such as information that the user has seen and heard or the state of the user. The information processing system includes, for example, a device that acquires the life data and a storage system that stores the acquired life data.

The storage capacity of the storage system is limited. Therefore, when all the life data acquired by the device is stored in the storage system and the total amount of the stored data has reached the storage capacity of the storage system, the storage system cannot record new life data. Therefore, it is difficult to store all the life data acquired by the device in the storage system for a long period of time.

The acquired life data may have different importance depending on the content. Therefore, a new function capable of storing important data for a long period of time is required.

BRIEF DESCRIPTION OF THE DRAWINGS

FIG. 3 is a block diagram illustrating an example of a plurality of storage areas that store each piece of content in stages, in the storage system according to the embodiment.

FIG. 5 is a block diagram illustrating an example of a configuration of analyzing content stored in a first storage in the storage system according to the embodiment.

FIG. 10 is a diagram illustrating a configuration example of a storage management table used in the storage system according to the embodiment.

DETAILED DESCRIPTION

In general, according to one embodiment, a storage system comprises one or more nonvolatile memories and a controller. The one or more nonvolatile memories each includes a plurality of blocks, each of the plurality of blocks being a unit of an erase operation. The controller is configured to manage, when one or more data portions are stored in one or more first blocks among the plurality of blocks, one or more possible storage periods for which the one or more data portions are to be stored, respectively, in respective corresponding blocks of the one or more first blocks. In a case where a first possible storage period corresponding to a first data portion among the one or more data portions is equal to or more than a first threshold in the one or more possible storage periods, the controller is configured to write the first data portion to one or more second blocks of the blocks that is different from the one or more first blocks and invalidate the first data portion stored in the one or more first blocks. In a case where the first possible storage period is less than the first threshold and a period for which the first data portion is stored in the one or more first blocks has reached the first possible storage period, the controller is configured to invalidate the first data portion stored in the one or more first blocks.

Various embodiments will be described hereinafter with reference to the accompanying drawings.

Figure 1:
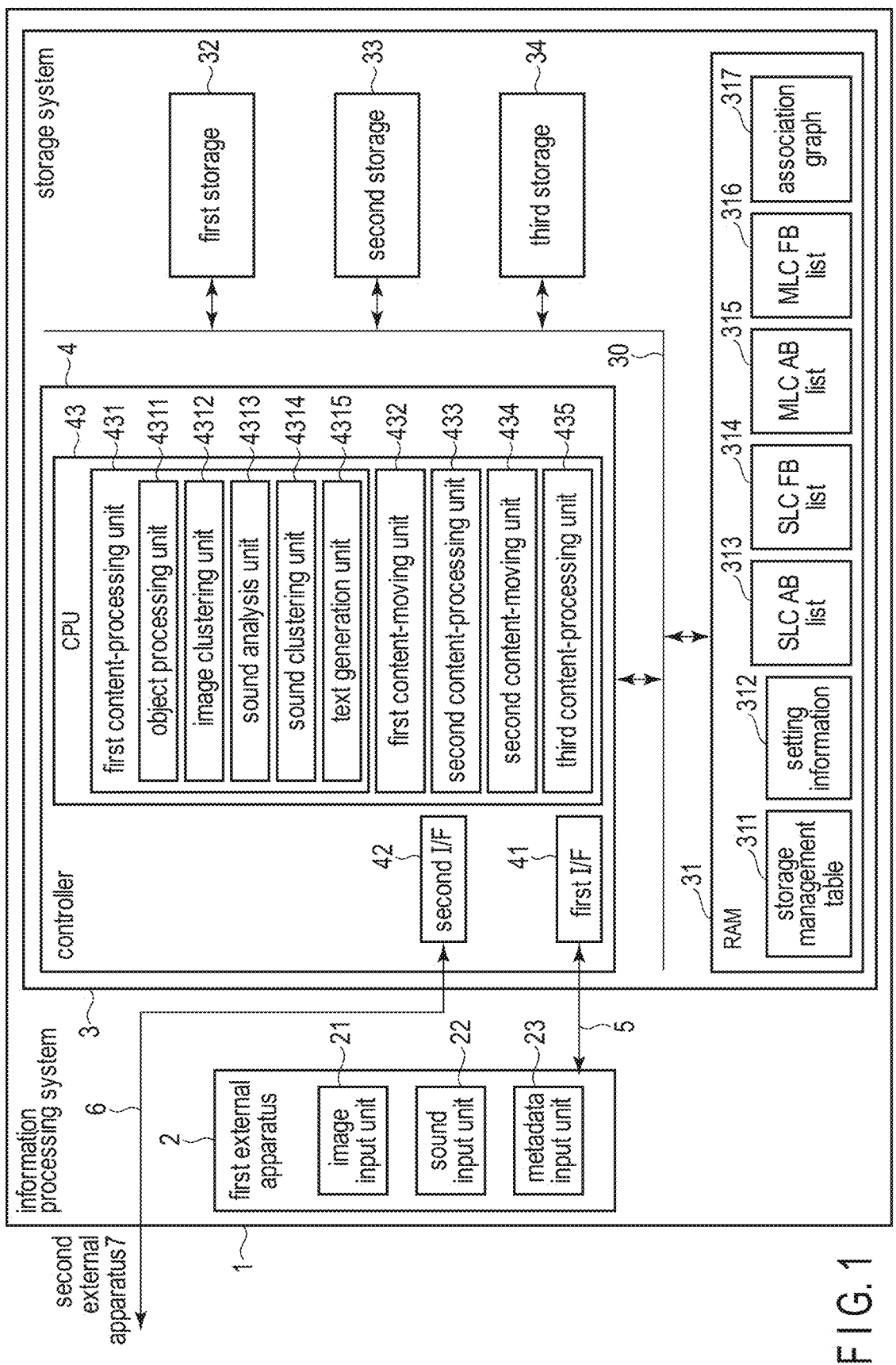
FIG. 1 is a block diagram illustrating an example of a configuration of an information processing system including a storage system according to an embodiment.

FIG. 1 is a block diagram illustrating an example of a configuration of an information processing system 1 that includes a storage system 3 according to an embodiment.

The information processing system 1 is a system for continuously recording life data of a user. The life data is data regarding life, experience, and the like of the user. The life data is, for example, data that includes information that a user has seen or heard, information regarding the state of the user, information regarding an environment in which the user is placed, and information based on an operation by the user. The recorded life data is used, for example, to assist memory of the user. The life data is also referred to as a life log. The information processing system 1 includes a first external apparatus 2 and a storage system 3.

The first external apparatus 2 and the storage system 3 can be connected via a first bus 5. The first bus 5 is a bus that conforms to, for example, Universal Serial Bus™ (USB™) standard, Bluetooth™, or the like. The first bus 5 is a bus that performs wired or wireless communication.

The first external apparatus 2 is an information processing device that generates life data. The first external apparatus 2 is a device that can be worn or carried by the user. The first external apparatus 2 is implemented as, for example, a wearable device including smart glasses and a smartwatch, a smartphone, and an in-vehicle device including a drive recorder. The first external apparatus 2 acquires information around the first external apparatus 2 and generates life data based on the acquired information. The life data includes at least one of image data, sound data, and metadata. The first external apparatus 2 transmits the generated life data to the storage system 3. Hereinafter, a case where the life data includes the image data, the sound data, and the metadata will be described, but the life data may include at least one of the image data, the sound data, and the metadata.

The storage system 3 is a storage device that includes one or more nonvolatile memories. The storage system 3 stores the life data received from the first external apparatus 2.

Here, a case where the first external apparatus 2 is one information processing device has been described. Note that the entire information processing system 1 may be implemented as one information processing apparatus, and the first external apparatus 2 may be implemented as a component incorporated in the information processing apparatus. That is, the information processing system 1 including the first external apparatus 2 may be implemented as one device for recording the life data.

The storage system 3 is connectable to a second external apparatus 7 through a second bus 6. The second bus 6 is a bus that conforms to, for example, Universal Serial Bus™ (USB™) standard, Bluetooth™, or the like. The second bus 6 connects the storage system 3 and the second external apparatus 7. The second bus 6 is a bus that performs wired or wireless communication.

The second external apparatus 7 is an information processing apparatus. The second external apparatus 7 is, for example, a computing device operated by the user. The second external apparatus 7 transmits setting information specified by the user to the storage system 3. The setting information is information for controlling an operation of the storage system 3. The setting information includes, for example, a parameter used to control a period for which the life data is to be stored in the storage system 3 (hereinafter, also referred to as a possible storage period), teaching data used by a first content-processing unit 431 to be described later, and information identifying a range of a position indicated by position information included in the metadata. In addition, the second external apparatus 7 may have a function of reading the life data from the storage system 3. The second external apparatus 7 may provide the life data for the user by using, for example, a display or a speaker in the second external apparatus 7.

Although FIG. 1 illustrates a case where the second external apparatus 7 is a device external to the information processing system 1, the information processing system 1 may be implemented as an information processing apparatus including the second external apparatus 7. In this case, the information processing system 1 (information processing apparatus) is implemented as, for example, a smartphone that includes a sensor (the first external apparatus 2) such as a microphone and a camera, a touch screen display (the second external apparatus 7), and a memory (the storage system 3).

Next, a configuration of the first external apparatus 2 will be described.

The first external apparatus 2 includes an image input unit 21, a sound input unit 22, and a metadata input unit 23. The life data generated by the first external apparatus 2 is composed of data acquired by each unit of the first external apparatus 2. Although FIG. 1 illustrates a case where the first external apparatus 2 is implemented as one device including the image input unit 21, the sound input unit 22, and the metadata input unit 23, the first external apparatus 2 may be implemented by a plurality of devices each including at least one of the units. In this case, each of the plurality of devices is connected to the storage system 3 through the first bus 5. As a result, the storage system 3 receives data from each of the plurality of devices. In addition, the first external apparatus 2 or the device including at least one of the units of the first external apparatus 2 may be worn or carried by the user. Hereinafter, it is assumed that the first external apparatus 2 including the image input unit 21, the sound input unit 22, and the metadata input unit 23 is implemented as one wearable device and the user wears the first external apparatus 2.

The image input unit 21 acquires image data. The image input unit 21 is a device including imaging elements, and is, for example, a camera. The image input unit 21 photographs the periphery of the first external apparatus 2. The data photographed by the image input unit 21 may be video data including one or more pieces of image data. The image input unit 21 associates the acquired image data with a timestamp indicating the time when the image data is acquired. The image input unit 21 photographs, for example, a scene viewed by the user wearing the first external apparatus 2.

The sound input unit 22 acquires sound data. The sound input unit 22 is a device including a sound collector, and is, for example, a microphone. The sound input unit 22 collects a sound around the first external apparatus 2. The sound input unit 22 associates sound data based on the collected sound with a timestamp indicating the time when the sound data is acquired. The sound input unit 22 collects, for example, a sound being heard by the user wearing the first external apparatus 2.

The metadata input unit 23 is a device that acquires metadata. The metadata is data including information regarding the image data acquired by the image input unit 21 and the sound data acquired by the sound input unit 22. The metadata includes, for example, position information of the first external apparatus 2, biological information of the user wearing the wearable device, environmental information around the first external apparatus 2, time, and information based on an operation by the user. The metadata input unit 23 associates the acquired metadata with a timestamp indicating the time when the metadata is acquired.

Next, an internal configuration of the storage system 3 will be described.

The storage system 3 includes, for example, a controller 4, a random access memory (RAM) 31, a first storage 32, a second storage 33, and a third storage 34. The controller 4, the RAM 31, the first storage 32, the second storage 33, and the third storage 34 are interconnected through an internal bus 30.

The controller 4 is a memory controller which is an example of a control circuit. The controller 4 is, for example, a semiconductor device such as a system-on-a-chip (SoC). The controller 4 executes writing of data to the RAM 31, the first storage 32, the second storage 33, and the third storage 34. The controller 4 executes reading of data from the RAM 31, the first storage 32, the second storage 33, and the third storage 34. In addition, the controller 4 executes communication with the first external apparatus 2 through the first bus 5. The controller 4 executes communication with the second external apparatus 7 through the second bus 6. The controller 4 receives life data from the first external apparatus 2 through the first bus 5.

The RAM 31 is a volatile memory. The RAM 31 is implemented by, for example, a static RAM (SRAM) or a dynamic RAM (DRAM). The RAM 31 stores, for example, information used to manage the storage system 3.

The first storage 32 is a volatile semiconductor memory. The first storage 32 is, for example, a dynamic random access memory (DRAM). The first storage 32 temporarily stores life data received by the controller 4. The life data received by the controller 4 is packed every unit period. Life data of one unit period, which is packed, is one data portion. The first storage 32 stores each of one or more data portions. The data portion is hereinafter referred to as content. Each of image data, sound data, and metadata included in one piece of content corresponds to one unit period. More specifically, for example, each of the image data, the sound data, and the metadata included in one content is associated with a timestamp indicating a time within the same unit period. In addition, content stored in the first storage 32 is also referred to as short-term storage content because the content is temporarily stored until being moved to the second storage 33 or erased.

Although FIG. 1 illustrates a case where the RAM 31 and the first storage 32 are implemented as different components, they may be implemented by one volatile memory (for example, DRAM). In this case, a part of the storage area of the DRAM is allocated as an area for storing information used to manage the storage system 3, and another part of the storage area of the DRAM is allocated as an area for temporarily storing the life data.

The second storage 33 is a nonvolatile semiconductor memory. The second storage 33 is, for example, a storage device or a memory device including a NAND flash memory. The NAND flash memory is, for example, a flash memory that includes a plurality of memory cells with a two-dimensional structure or a three-dimensional structure. The NAND flash memory includes a plurality of blocks. The block is a minimum unit of erasing of data stored in the NAND flash memory. Each block included in the NAND flash memory of the second storage 33 is also referred to as a first block. Content satisfying a condition among the pieces of content stored in the first storage 32 is written to the second storage 33. The content written in the second storage 33 may include feature data which is information indicating the feature of the content. In addition, the content stored in the second storage 33 is also referred to as middle-term storage content because the content is temporarily stored from when the content is moved from the first storage 32 to when the content is moved to the third storage 34 or erased.

The third storage 34 is a nonvolatile semiconductor memory. The third storage 34 is, for example, a storage device or a memory device including a NAND flash memory. Each block included in the NAND flash memory of the third storage 34 is also referred to as a second block. The third storage 34 stores content satisfying a condition among the pieces of content stored in the second storage 33. In addition, the content stored in the third storage 34 is also referred to as long-term storage content because the content is moved from the second storage 33.

Here, the storage system 3 is, for example, a solid-state drive (SSD). The second storage 33 and the third storage 34 may be different chips or packages in the storage system 3 or may be different chips in the same package. In addition, the second storage 33 and the third storage 34 may be different SSDs each including one or more NAND flash memories.

Alternatively, each of the second storage 33 and the third storage 34 may be included in a storage area of one NAND flash memory. In this case, one NAND flash memory includes one or more first blocks constituting the second storage 33 and one or more second blocks constituting the third storage 34.

Hereinafter, a case where the first storage 32 is implemented by a DRAM, the second storage 33 is implemented by a NAND flash memory including memory cells to which data is written in a single-level cell (SLC) mode, and the third storage 34 is implemented by a NAND flash memory including memory cells to which data is written in a multi-level cell (MLC) mode will be described.

The SLC mode is used when data is written to a memory cell included in a block of the second storage 33. In the SLC mode, one bit of data is written per a memory cell.

The MLC mode is used when data is written to a memory cell included in a block of the third storage 34. In the MLC mode, two or more bits of data are written per a memory cell. For example, a mode for performing control so as to write 2-bit data per memory cell is referred to as an MLC mode, a mode for performing control so as to write 3-bit data per memory cell is referred to as a triple-level cell (TLC) mode, and a mode for performing control so as to write 4-bit data per memory cell is referred to as a quad-level cell (QLC) mode. That is, the TLC mode or the QLC mode may be used when data is written to a memory cell included in a block of the third storage 34.

The number of bits of data written per memory cell of the third storage 34 is larger than the number of bits of data written per memory cell of the second storage 33. For example, it is assumed that N bits of data per memory cell are written to the second storage 33 and M bits of data per memory cell are written to the third storage 34. In this case, N is an integer larger than or equal to one, and M is an integer larger than N.

Next, an example of an internal configuration of the controller 4 will be described. The controller 4 includes a first interface (I/F) 41, a second interface (I/F) 42, and a central processing unit (CPU) 43.

The first I/F 41 is an interface circuit configured by hardware. The first I/F 41 executes communication with the first external apparatus 2 through the first bus 5. The first I/F 41 receives at least one of image data, sound data, and metadata from the first external apparatus 2. Data received by the first I/F 41 may be life data including at least one of image data, sound data, and metadata.

The second I/F 42 is an interface circuit configured by hardware. The second I/F 42 executes communication with the second external apparatus 7 through the second bus 6. The second I/F 42 receives the setting information specified by the user from the second external apparatus 7.

The CPU 43 is a processor. The CPU 43 controls the first I/F 41 and the second I/F 42. In addition, the CPU 43 controls the writing of data to the RAM 31, the first storage 32, the second storage 33, and the third storage 34. The CPU 43 loads a control program (firmware) from a ROM or a nonvolatile memory (not illustrated) into the RAM 31. The CPU 43 performs various processes by executing the control program. The CPU 43 executes, for example, management of data stored in the first storage 32, the second storage 33, and the third storage 34, and management of blocks included in the second storage 33 and the third storage 34.

Next, an example of a functional configuration of the CPU 43 will be described. For example, the CPU 43 functions as the first content-processing unit 431, a first content-moving unit 432, a second content-processing unit 433, a second content-moving unit 434, and a third content-processing unit 435, by executing the above-described control program.

The first content-processing unit 431 executes processing related to content that is stored in the first storage 32. Specifically, the first content-processing unit 431 analyzes each piece of content stored in the first storage 32 and generates feature data of each piece of content, based on an analysis result. The feature data includes, for example, an object image, image clustering information, a voiceprint, sound clustering information, and text data. The object image is image data of an object generated by processing image data included in corresponding content. The image clustering information includes, for example, a label which is character string information indicating the name of a person or an object that is extracted as an object from image data in corresponding content. The image clustering information may be generated based on not only the object image but also the image data or the temporal change of the image data or the object image. In addition, the person or the object extracted as the object may be various visual features such as an event, a phenomenon, a color, and complexity. The voiceprint is information indicating the feature of sound data included in corresponding content. The voiceprint may be information indicating a feature of a sound other than human or animal voice. The sound clustering information includes a label which is character string information indicating the name of a person, an object, or the like identified based on the feature (voiceprint) of sound data included in the corresponding content. The sound clustering information may be extracted not only from the voiceprint but also from sound data or a combination of sound data and a voiceprint. In addition, the identified person or object may be a feature of various sounds such as an event, a phenomenon, a tone, sound quality, a type, and music. The text data includes an audio text which is character string information representing a word produced or a sound produced in the sound data. The processing executed by the first content-processing unit 431 is also referred to as a short-term storage content process.

The first content-processing unit 431 includes an object processing unit 4311, an image clustering unit 4312, a sound analysis unit 4313, a sound clustering unit 4314, and a text generation unit 4315.

The object processing unit 4311 generates an object image. The object processing unit 4311 generates one or more object images based on image data included in content. The object processing unit 4311 generates an object image by, for example, extracting an image of a person or an object from the image data. The object processing unit 4311 associates the generated object image with the content.

The image clustering unit 4312 classifies the generated object images. The image clustering unit 4312 generates image clustering information including a corresponding label for each person or object extracted in the object image. The image clustering unit 4312 associates the generated image clustering information with the corresponding object image. The image clustering unit 4312 may generate image clustering information on the basis of teaching data that is acquired from the second external apparatus 7 through the second I/F 42. The image clustering unit 4312 associates the generated image clustering information with the content.

The sound analysis unit 4313 analyzes sound data and extracts a voiceprint which is a feature of the sound data. The voiceprint is a feature that is used to identify a person who has produced the sound or an object that has produced the sound.

The sound clustering unit 4314 specifies a person who has produced the sound based on the feature of the sound obtained from the sound data. Alternatively, the sound clustering unit 4314 identifies an object that has produced the sound, based on the feature obtained from the sound data. For example, the sound clustering unit 4314 uses the voiceprint extracted by the sound analysis unit 4313. For example, the sound clustering unit 4314 identifies a person or an object, based on teaching data acquired from the second external apparatus 7 through the second I/F 42. The sound clustering unit 4314 generates sound clustering information including a label corresponding to the identified person or object. The sound clustering unit 4314 associates the generated sound clustering information with the content.

The text generation unit 4315 analyzes sound data and generates text data corresponding to the sound produced in the sound data. When sound produced by a person is included in the sound data, the text generation unit 4315 generates text data indicating utterance content in the sound data. Furthermore, when the sound data includes a sound produced by an object, the text generation unit 4315 generates text data (for example, an onomatopoeia or the like) indicating the sound being produced. The text generation unit 4315 associates the generated text data with the content.

The first content-moving unit 432 executes a process of moving content stored in the first storage 32 to the second storage 33. Specifically, when the oldest content among the pieces of content stored in the first storage 32 is not similar to the next oldest content, the first content-moving unit 432 moves the oldest content to the second storage 33. The oldest content is the content whose time indicated by the time information included in the metadata is the earliest among the pieces of content stored in the first storage 32. The next oldest content is the content whose time indicated by the time information included in the metadata is the second earliest among the pieces of content stored in the first storage 32. The operation of moving a target content to the second storage 33 is an operation of writing, to the second storage 33, the target content read from the first storage 32 and then erasing the target content stored in the first storage 32. When the oldest content is similar to the next oldest content, the first content-moving unit 432 erases the oldest content. Note that the first content-moving unit 432 may erase or compress a part of the components included in the oldest content instead of erasing the oldest content. For example, the first content-moving unit 432 may individually erase or compress the image data, sound data, and the like included in the oldest content.

The second content-processing unit 433 manages possible storage periods corresponding to respective pieces of content stored in the second storage 33. Hereinafter, a time elapsed after a content is stored in the second storage 33 is referred to as a storage period. In addition, a period for which the content is to be stored in the second storage 33 (a period for which the content can be stored in the second storage 33) is referred to as a possible storage period. When the pieces of content stored in the second storage 33 include content whose storage period has reached its possible storage period, the second content-processing unit 433 invalidates the content. The invalidated content is content not to be read from the second storage 33 anymore. An initial value of the possible storage period corresponding to each piece of content is set based on the setting information 312 received through the second I/F 42. When a first content stored in the second storage 33 satisfies at least one extension condition of one or more extension conditions, the second content-processing unit 433 adds an extension period corresponding to the satisfied extension condition to the possible storage period corresponding to the first content. The extension period corresponding to the extension condition is set based on the setting information 312 received through the second I/F 42.

The second content-moving unit 434 executes a process of moving content stored in the second storage 33 to the third storage 34 (middle-term storage content moving process). Specifically, when pieces of content stored in the second storage 33 include content whose possible storage period has reached a first threshold, the second content-moving unit 434 moves the content to the third storage 34. The operation of moving a target content to the third storage 34 is an operation of writing, to the third storage 34, the target content read from the second storage 33 and then invalidating the target content stored in the second storage 33.

In addition, the second content-moving unit 434 may move content stored in the second storage 33 to the third storage 34 when an index indicating a free storage area in the second storage 33 that can newly store data has become a threshold or less. Specifically, the second content-moving unit 434 writes, to the third storage 34, all pieces of content which are not invalidated and are stored in a block (oldest block) for which a start time of writing data is earliest among the blocks of the second storage 33. Then, the second content-moving unit 434 invalidates all the pieces of content stored in the oldest block of the second storage 33. As a result, the oldest block becomes a block in which no valid content is stored (i.e., free block).

The third content-processing unit 435 generates an association graph 317 based on content stored in the third storage 34. In addition, for example, the third content-processing unit 435 updates the association graph 317 in response to content being newly stored in the third storage 34. The association graph 317 indicates an association between pieces of content stored in the third storage 34. In addition, the third content-processing unit 435 may generate the association graph 317 based on the pieces of content stored in the second storage 33 and the pieces of content stored in the third storage 34. The association between the pieces of content is, for example, information based on an object image and text data included in each piece of content.

Next, information stored in the RAM 31 will be described. The information stored in the RAM 31 includes a storage management table 311, the setting information 312, an SLC active block (AB) list 313, an SLC free block (FB) list 314, an MLC active block (AB) list 315, an MLC free block (FB) list 316, and the association graph 317.

The storage management table 311 is information for managing a possible storage period, a storage time limit, and a status of each piece of content stored in the second storage 33. The storage time limit indicates a time limit by which a corresponding content can be stored in the second storage 33. For example, the storage time limit is calculated by the sum of the time when the content is stored in the second storage 33 and its possible storage period.

The setting information 312 is information for controlling an operation of the storage system 3. The setting information 312 is used by the CPU 43. The setting information 312 is, for example, information designated based on an operation by the user on the second external apparatus 7. The setting information 312 includes, for example, teaching data that is used by the first content-processing unit 431 and a parameter that is used by the second content-processing unit 433. The setting information 312 is received from the second external apparatus 7 through the second I/F 42, for example. The setting information 312 may be stored in advance as an initial value of the storage system 3.

The SLC AB list 313 is a list of blocks each storing at least one piece of valid content among the one or more blocks included in the second storage 33. The valid content is content to possibly be read from the second storage 33 later.

The SLC FB list 314 is a list of blocks each storing no valid content among the one or more blocks included in the second storage 33.

The MLC AB list 315 is a list of blocks each storing at least one piece of valid content among the one or more blocks included in the third storage 34.

The MLC FB list 316 is a list of blocks each storing no valid content among the one or more blocks included in the third storage 34.

The association graph 317 is information indicating association between pieces of content stored in the third storage 34. Note that the association graph 317 may be information indicating association between pieces of content stored in the third storage 34 and the second storage 33.

Figure 2:
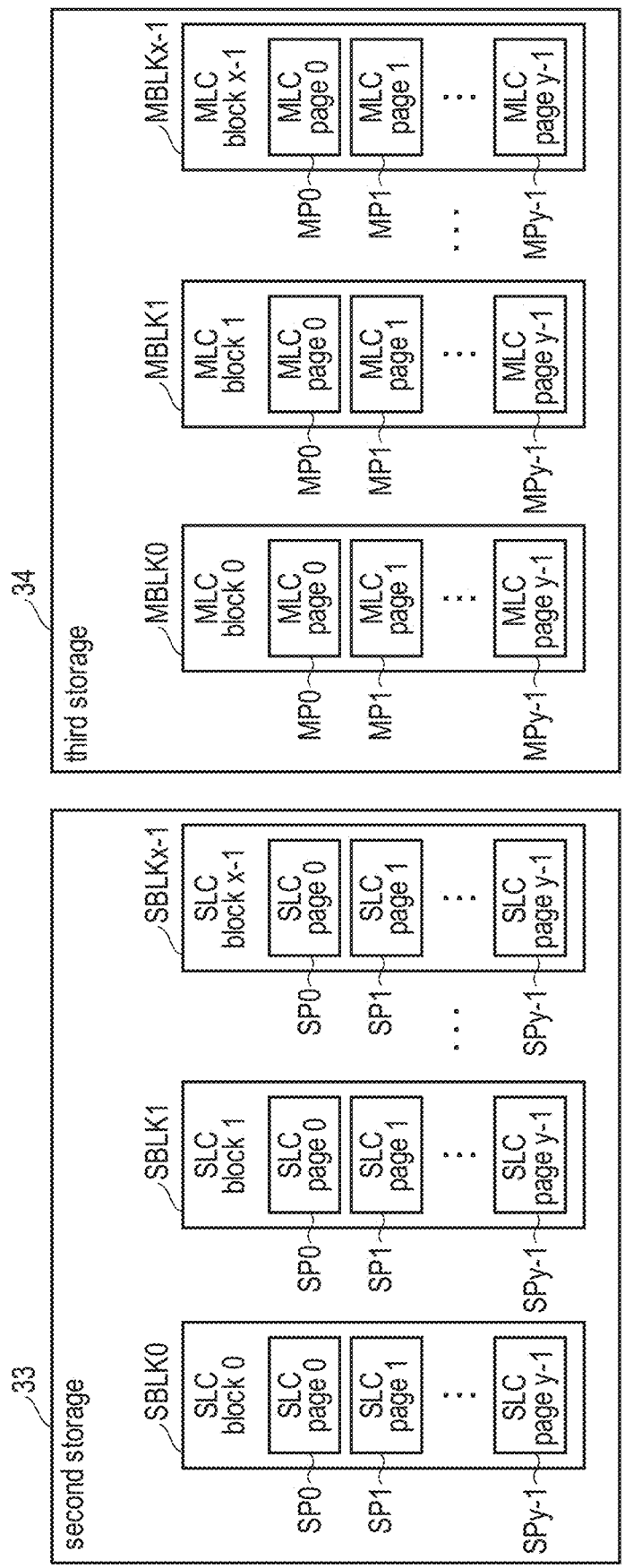
FIG. 2A is a block diagram illustrating an example of a configuration of a second storage included in the storage system according to the embodiment.
FIG. 2B is a block diagram illustrating an example of a configuration of a third storage included in the storage system according to the embodiment.

Next, a configuration example of the second storage 33 and the third storage 34 will be described. FIGS. 2A and 2B are block diagrams respectively illustrating configuration examples of the second storage 33 and the third storage 34 included in the storage system 3 according to the embodiment.

As illustrated in FIG. 2A, the second storage 33 includes a plurality of SLC blocks (here, x SLC blocks) SBLK0 to SBLKx-1 each of which is a block capable of storing data in the SLC mode. The block is also referred to as a physical block, an erase block, a flash block, or a memory block. Each of the SLC blocks SBLK0 to SBLKx-1 includes a plurality of SLC pages (here, y SLC pages) SP0 to SPy-1. Each of the SLC pages SP0 to SPy-1 is a minimum unit of a data write operation and a data read operation for each of the SLC blocks SBLK0 to SBLKx-1 included in the second storage 33. The data write operation is an operation for writing data. The data read operation is an operation for reading data. Each of the SLC pages SP0 to SPy-1 includes a plurality of memory cells connected to the same word line. The number of bits of data written to each of the plurality of memory cells in each of the SLC pages SP0 to SPy-1 is one.

In addition, as illustrated in FIG. 2B, the third storage 34 includes a plurality of MLC blocks (here, x MLC blocks) MBLK0 to MBLKx-1 each of which is a block capable of storing data in the MLC mode. Each of the MLC blocks MBLK0 to MBLKx-1 includes a plurality of MLC pages (here, y MLC pages) MP0 to MPy-1. Each of the MLC pages MP0 to MPy-1 includes a plurality of memory cells connected to the same word line. The number of bits of data written to each of the plurality of memory cells in each of the MLC pages MP0 to MPy-1 is two or more.

For example, when the number of bits of data written per memory cell in the third storage 34 is four (in the case of the QLC mode), the amount of data that can be written in one MLC block is about four times the amount of data that can be written in one SLC block. Therefore, even when the same number of blocks are included in the second storage 33 and the third storage 34, the third storage 34 can store more amount of data.

The SLC block requires less time for an operation of writing data and an operation of reading data than the MLC block. Therefore, data can be written and read in a shorter time for content stored in the SLC block than for content stored in the MLC block. In addition, the number of times of erasing in which an operation of the SLC block is guaranteed is larger than the number of times of erasing in which an operation of the MLC block is guaranteed. That is, the SLC block is suitable for operations in which data rewriting is repeated more frequently than the MLC block.

Next, the movement of content in the storage system 3 will be described. FIG. 3 is a block diagram illustrating an example of a plurality of storage areas for storing each piece of content in stages, in the storage system 3.

The controller 4 temporarily stores the content received from the first external apparatus 2 in the first storage 32. Then, the controller 4 moves a content satisfying the condition among the pieces of content stored in the first storage 32 to the second storage 33. Further, the controller 4 moves a content satisfying the condition among the pieces of content stored in the second storage 33 to the third storage 34.

A specific operation will be described with reference to FIG. 3. First, the first I/F 41 of the controller 4 receives the life data from the first external apparatus 2. The controller 4 generates one piece of content by packing the received life data for each unit period. The controller 4 stores the generated content in the first storage 32. The unit period is, for example, 30 seconds. For example, the first I/F 41 may receive a content already packed as the life data, or may individually receive each of the image data, the sound data, and the metadata constituting the life data. When the image data, the sound data, and the metadata are individually received, the controller 4 generates content by packing each piece of data acquired in one unit period with reference to a timestamp associated with each piece of data.

Specifically, for example, one piece of content is generated by packing the life data acquired in the first unit period. Next, one piece of subsequent content is generated by packing the life data acquired in the second unit period after the first unit period. That is, one piece of content is newly stored in the first storage 32 every unit period (for example, every 30 seconds). Therefore, it is necessary to secure a free storage area in the first storage 32 in which data can be newly stored so that new content can be stored every unit period. Therefore, the content stored in the first storage 32 needs to be periodically erased. Hereinafter, the erasing of the content stored in the first storage 32 includes erasing of the content or invalidation of the content.

The first content-processing unit 431 analyzes content stored in the first storage 32.

The first content-moving unit 432 executes, based on the content analysis result by the first content-processing unit 431, a process of moving the oldest content (target content) among the pieces of content stored in the first storage 32 to the second storage 33 or erasing the oldest content (target content) without writing the content in the second storage 33 (short-term storage content erasing process). Specifically, the first content-moving unit 432 determines whether the target content is to be moved to the second storage 33. When it is determined that the target content should not be moved to the second storage 33, the first content-moving unit 432 erases the target content. When it is determined that the target content should be moved to the second storage 33, the first content-moving unit 432 writes the target content in a write destination SLC block of the second storage 33. Then, when the writing of the target content is completed, the first content-moving unit 432 erases the target content stored in the first storage 32.

The first content-moving unit 432 periodically executes the short-term storage content erasing process, for example.

Since the content is generated by packing the life data for each unit period, the frequency at which one piece of content is stored in the first storage 32 is constant. That is, the free storage area in the first storage 32 in which new data can be stored is periodically consumed. Therefore, the first content-moving unit 432 periodically executes the short-term storage content erasing process. Alternatively, the first content-moving unit 432 may execute the short-term storage content erasing process in response to an index indicating the free storage area of the first storage 32 being equal to or less than a threshold. The index indicating the free storage area of the first storage 32 is, for example, the size of the free storage area in the first storage 32 in which data can be newly stored or the ratio of the size of the free storage area in which data can be newly stored to the storage capacity of the first storage 32.

When the write destination SLC block of the second storage 33 becomes full, the CPU 43 deallocates the full SLC block from the write destination SLC block. The full SLC block is an SLC active block in which there is no storage area in which new data can be written. Then, the CPU 43 selects any block from the SLC free blocks registered in the SLC FB list 314. At this time, in consideration of wear leveling, the CPU 43 may preferentially select an SLC free block in which the number of times the erase operation is executed is small among the SLC free blocks registered in the SLC FB list 314. After executing the data erase operation on the selected SLC free block, the CPU 43 allocates the selected SLC free block to the new write destination SLC block. Then, the CPU 43 registers the SLC block allocated to the write destination SLC block in the SLC AB list 313.

The second content-processing unit 433 manages the possible storage period corresponding to each piece of content stored in the second storage 33. The second content-processing unit 433 determines whether at least one extension condition among a plurality of extension conditions is satisfied for each piece of content stored in the second storage 33. When a certain piece of content satisfies at least one extension condition among the plurality of extension conditions, the CPU 43 adds an extension period corresponding to the satisfied extension condition to a possible storage period corresponding to the content.

When the possible storage period corresponding to the any one of the pieces of content stored in the second storage 33 has reached the first threshold, the second content-moving unit 434 writes the content to a write destination MLC block of the third storage 34. Then, the second content-moving unit 434 invalidates the content stored in the second storage 33.

Further, when the storage period of the content stored in the second storage 33 has reached the possible storage period corresponding to the content, the second content-moving unit 434 invalidates the content stored in the second storage 33.

When an SLC block not storing valid content exists among the SLC blocks, other than the write destination SLC block, registered in the SLC AB list 313, the CPU 43 registers the SLC block in the SLC FB list 314.

When the write destination MLC block becomes full after the content stored in the second storage 33 is written to the write destination MLC block of the third storage 34, the CPU 43 deallocates the full MLC block from the write destination MLC block. Then, the CPU 43 selects any block from the MLC free blocks of the third storage 34 registered in the MLC FB list 316. At this time, in consideration of wear leveling, the CPU 43 may preferentially select a MLC free block in which the number of times the erase operation is executed is small among the MLC free blocks registered in the MLC FB list 316. After executing the data erase operation on the selected MLC free block, the CPU 43 allocates the selected MLC free block to the new write destination MLC block. Then, the CPU 43 registers the MLC block allocated to the write destination MLC block in the MLC AB list 315.

Figure 4:
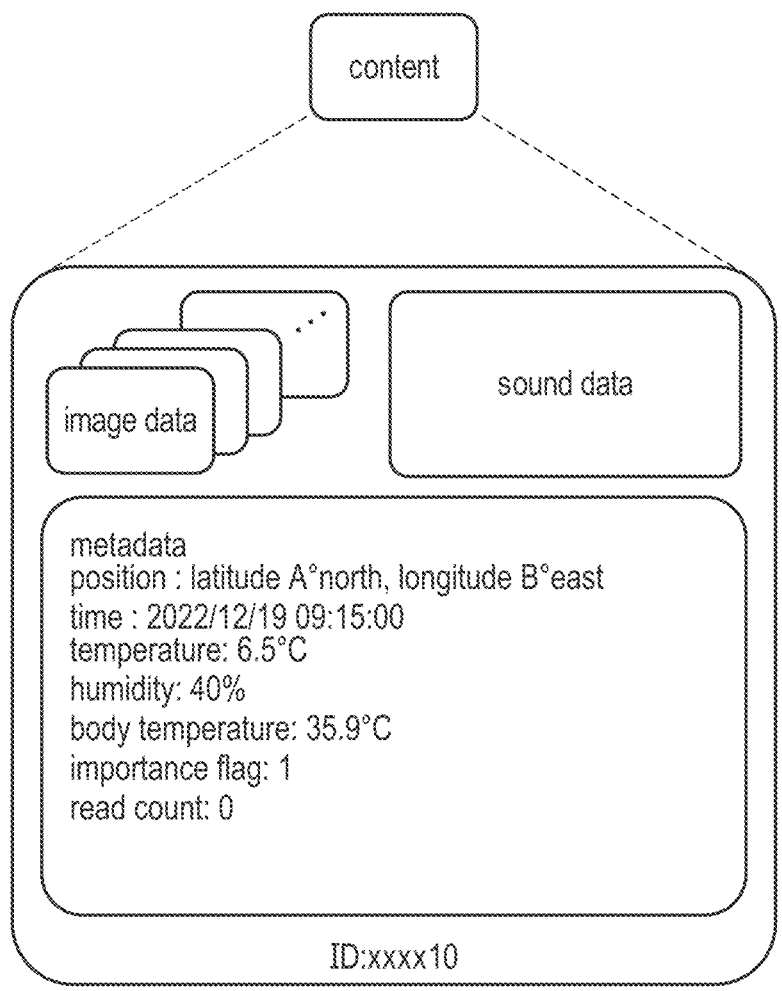
FIG. 4 is a diagram illustrating an example of a configuration of content stored in the storage system according to the embodiment.

Next, a configuration of content will be described. FIG. 4 is a diagram illustrating an example of a configuration example of the content stored in the storage system 3.

The content includes one or more pieces of image data, sound data, and metadata. Each piece of data included in the content is data acquired within a specific period (unit period). An identifier (ID) is assigned to the content. The identifier is information that can identify one piece of the corresponding content.

The one or more pieces of image data are image data that is obtained by photographing the periphery of the first external apparatus 2. Each of the one or more pieces of image data is acquired by the image input unit 21.

The sound data is sound data that is obtained by collecting sounds around the first external apparatus 2. The sound data is acquired by the sound input unit 22.

The metadata includes position information of the first external apparatus 2, time information, biological information of the user wearing the first external apparatus 2, environmental information around the first external apparatus 2, information regarding whether the corresponding life data is important, and read count information. Each piece of information included in the metadata is acquired by, for example, the metadata input unit 23.

The position information is, for example, information indicating the position of the first external apparatus 2 when the content is acquired. Note that the time when the content is acquired means the time when any data included in the content is acquired by the first external apparatus 2. The position information is based on, for example, a global positioning system (GPS) signal received by the first external apparatus 2. The position information is represented by, for example, latitude and longitude.

The time information is, for example, information indicating the time when the acquisition of the content is started. The time information may be information indicating any time within the unit period in which the content is acquired, instead of the time at which the acquisition of the content is started.

The biological information of the user is, for example, information indicating at least one of the body temperature, the heart rate, the dryness, and the potential of the user. The biological information of the user may indicate an average value, a minimum value, or a maximum value within the unit period in which the content is acquired, or may indicate a value at any time within the unit period.

The environmental information around the first external apparatus 2 is, for example, information indicating at least one of temperature, humidity, and odor in the environment in which the user is placed. The environmental information around the first external apparatus 2 may indicate an average value, a minimum value, or a maximum value within the unit period in which the content is acquired, or may indicate a value at any time within the unit period.

Furthermore, the information regarding whether the life data is important can be determined based on a mode of the first external apparatus 2, for example. Information indicating importance is assigned to the life data acquired while the first external apparatus 2 is in a first mode. The information indicating the importance is, for example, an importance flag set to one. On the other hand, information indicating unimportance is assigned to the life data acquired while the first external apparatus 2 is in a second mode. The information indicating unimportance is, for example, an importance flag set to zero. The first mode and the second mode of the first external apparatus 2 may be switched by, for example, pressing a button (not illustrated) provided in the first external apparatus 2. The button is operated, for example, by a user wearing a wearable device.

The read count information indicates the number of times the content is read from the storage system 3. The content is read from the storage system 3 by the second external apparatus 7, for example. The second external apparatus 7 reads, for example, content to be reproduced from the storage system 3. That is, a content which is read a large number of times is considered to be content which is requested to be reproduced and has high importance.

The metadata is generated by the metadata input unit 23 based on at least one of the acquired data.

FIG. 4 illustrates the content to which IDxxxx10 is assigned. Hereinafter, the content assigned with IDxxxx10 is referred to as content xxxx10.

That is, the content xxxx10 includes one or more pieces of image data, sound data, and metadata. The metadata of the content xxxx10 includes position information, time information, temperature information, humidity information, body temperature information, importance flag information, and read count information.

The position information indicates the position of the first external apparatus 2 when the content xxxx10 (more particularly, data packed as the content xxxx10) is acquired. In the example illustrated in FIG. 4, it is illustrated that the position of the first external apparatus 2 when the content xxxx10 is acquired is A degrees north latitude and B degrees east longitude.

The time information indicates the time at which the acquisition of the content xxxx10 is started. The example illustrated in FIG. 4 indicates that the time at which the acquisition of the content xxxx10 is started is 9:15:00 on Dec. 19, 2022. For example, when the unit period is 30 seconds, the content xxxx10 is content obtained by packing the life data acquired from 9:15:00 on Dec. 19, 2022, to 9:15:30 on Dec. 19, 2022.

The temperature information indicates the temperature around the first external apparatus 2 when the content xxxx10 is acquired. This temperature is, for example, an average value of temperatures in the unit period in which the content xxxx10 is acquired. The example illustrated in FIG. 4 indicates that the temperature around the first external apparatus 2 when the content xxxx10 is acquired is 6.5° C.

The humidity information indicates the humidity around the first external apparatus 2 when the content xxxx10 is acquired. This humidity is, for example, an average value of the humidities in the unit period in which the content xxxx10 is acquired. The example illustrated in FIG. 4 indicates that the humidity around the first external apparatus 2 when the content xxxx10 is acquired is 40%.

The body temperature information indicates the body temperature of the user wearing or carrying the first external apparatus 2 when the content xxxx10 is acquired. This body temperature is, for example, an average value of the body temperatures of the users in the unit period in which the content xxxx10 is acquired. The example illustrated in FIG. 4 indicates that the body temperature of the user when the content xxxx10 is acquired is 35.9° C.

The importance flag information is information indicating whether the content xxxx10 is important. For example, "1" that indicates importance is set to the importance flag of the content acquired while the first external apparatus 2 is in the first mode. In addition, "0" indicating unimportance is set to the importance flag of the content acquired while the first external apparatus 2 is in the second mode. In the example illustrated in FIG. 4, it is indicated that the content xxxx10 is important (that is, 1).

The read count information indicates the number of times the content xxxx10 has been read from the storage system 3. The content xxxx10 is read from the storage system 3 by the second external apparatus 7, for example. The example illustrated in FIG. 4 indicates that the number of times the content xxxx10 is read from the storage system 3 is 0. That is, the content xxxx10 has never been read from the storage system 3.

Next, the processing of acquiring feature data of content (short-term storage content process) will be described. FIG. 5 is a block diagram illustrating an example of a configuration of analyzing content stored in the first storage 32.

The feature data includes, for example, an object image and image clustering information generated from image data, and a voiceprint, sound clustering information, and text data generated from sound data. The image clustering information includes a label generated based on the image data. The sound clustering information includes a label generated based on the sound data. The text data includes an audio text generated based on the sound data. The generated feature data may be added to the corresponding content. The object image is partial image data representing a specific person or object in the image data. The object image is, for example, an image obtained by cutting only a region in which a specific person is captured in the photographed image, and an image obtained by cutting only a region in which a specific object is captured in the photographed image. The label included in the image clustering information is, for example, a text indicating the name of a person or an object represented in the object image. The label included in the sound clustering information is, for example, a text indicating the name of a person or an object corresponding to the voiceprint. In addition, the audio text, which is data generated based on the sound data, is text data representing a word pronounced or a sound produced in the sound data. The audio text may include a text representing an environmental sound as an onomatopoeia in addition to words produced by a person. The environmental sound includes, for example, a sound of rain, a sound of a car, a voice and a sound produced by a living thing, and the like.

Here, it is assumed that the short-term storage content process is executed for the content xxxx10. In this case, the first content-processing unit 431 acquires feature data of the content xxxx10.

First, a process of acquiring a part of the feature data of the content xxxx10 from the image data included in the content xxxx10 will be described.

The object processing unit 4311 generates an object image from each of one or more pieces of image data included in the content xxxx10. The object processing unit 4311 generates an object image by extracting an area including an object from the image data. The object processing unit 4311 associates the generated object image with the content xxxx10. The object is, for example, a person and an object. The object processing unit 4311 can generate one or more object images from one image data.

Next, the image clustering unit 4312 classifies the generated object images based on objects included in the object images. For example, two or more object images including the same person or object are classified as object images of the same group. At this time, the image clustering unit 4312 can classify the object image based on teaching data received by the second I/F 42 or content analyzed in the past. In addition, the image clustering unit 4312 may classify the object images using the setting information 312 uniquely stored in the storage system 3. The image clustering unit 4312 associates labels corresponding to the classified object image with the content xxxx10 as image clustering information. For example, a label indicating the name of a person or an object indicated by an object included in the classified object image is associated with the classified object image. Since the object image is an image including a person or an object, one object image can be associated with one or more labels. Note that the image clustering unit 4312 may generate the image clustering information regarding the basis of not only the object image but also the image data included in the content xxxx10. Furthermore, the image clustering unit 4312 may generate image clustering information regarding the basis of a temporal change in image data included in the content xxxx10 or an associated object image.

Next, a process of acquiring another part of the feature data of the content xxxx10 from the sound data included in the content xxxx10 will be described.

The sound analysis unit 4313 and the sound clustering unit 4314 identify a clustering target from the sound data included in the content xxxx10. The sound analysis unit 4313 generates a voiceprint indicating a characteristic sound from the sound data. The sound analysis unit 4313 associates the generated voiceprint with the content xxxx10. For example, the sound clustering unit 4314 discriminates human voice from the voiceprint and identifies a person who is producing a voice. Furthermore, the sound clustering unit 4314 identifies, from the voiceprint, an object producing, for example, a voice or a sound of an animal, an environmental sound, a sound of an object, or the like. At this time, the sound analysis unit 4313 and the sound clustering unit 4314 identify a person who has produced a voice and an object that has produced a sound based on teaching data received by the second I/F 42 and content analyzed in the past. In addition, the sound clustering unit 4314 may identify a person who has produced a voice or an object that has produced a sound from a voiceprint using the setting information 312 uniquely stored in the storage system 3. The sound clustering unit 4314 can identify, for example, a name from a voice produced by a person, a name from a song of a bird, a sound of a wave from an environmental sound, or a vehicle type from an engine sound of a car. For example, when a person who has produced a voice or an object that has produced a sound can be identified, the sound clustering unit 4314 associates a label indicating the name of the identified person or object with the content xxxx10 as sound clustering information. On the other hand, when the person who has produced a voice or the object that has produced a sound cannot be identified, the sound analysis unit 4313 and the sound clustering unit 4314 may record the person who has produced the voice or the object that has produced the sound in the sound data as a new person or object. Furthermore, the sound clustering unit 4314 can generate a plurality of pieces of sound clustering information from one voiceprint. For example, the sound clustering unit 4314 can generate sound clustering information indicating a vehicle type and sound clustering information indicating the operating state of an engine from a voiceprint obtained by extracting the engine sound of a vehicle. Furthermore, the sound clustering unit 4314 may generate sound clustering information regarding the basis of not only the voiceprint but also the sound data included in the content xxxx10.

Furthermore, the text generation unit 4315 generates an audio text based on the sound data. The text generation unit 4315 analyzes pronounced words and produced sounds in the sound data and converts them into sentences. That is, the text generation unit 4315 converts human voice, environmental sound, and the like into sentences. The text generation unit 4315 associates the audio text indicating the converted sentence with the content xxxx10 as text data.

The object image, the voiceprint, the image clustering information, the sound clustering information, and the text data generated in the short-term storage content process may be added to the content xxxx10 when the content xxxx10 is moved from the first storage 32 to the second storage 33. Alternatively, the object image, the voiceprint, the image clustering information, the sound clustering information, and the text data may be stored in the first storage 32 together with the content xxxx10.

Next, the short-term storage content erase process by the first content-moving unit 432 will be described. As described above, the short-term storage content erase process is the processing of moving the oldest content among the pieces of content stored in the first storage 32 to the second storage 33 or erasing the oldest content among the pieces of content stored in the first storage 32 without writing the content in the second storage 33, based on the content analysis result by the first content-processing unit 431. For example, the first content-moving unit 432 starts the short-term storage content erase process in response to the size of the free storage area of the first storage 32 being equal to or smaller than the threshold. In the short-term storage content erase process, the first content-moving unit 432 compares temporally continuous content stored in the first storage 32.

The first content-moving unit 432 selects the oldest content among the pieces of content stored in the first storage 32 as the first target content. The first content-moving unit 432 determines whether the first target content is similar to the next oldest content after the first target content.

The first content-moving unit 432 uses the feature data when determining whether two pieces of content are similar to each other. For example, the first content-moving unit 432 determines whether there is non-common feature data in the feature data of each piece of content included in each of the two pieces of content. For example, when one piece of content has feature data that the other piece of content does not have, the first content-moving unit 432 determines that these two pieces of content are not similar to each other.

When the first target content is similar to the next oldest content after the first target content, the first content-moving unit 432 erases the first target content from the first storage 32.

When the first target content is not similar to the next oldest content after the first target content, the first content-moving unit 432 writes the first target content in the second storage 33. Then, the first content-moving unit 432 erases the first target content from the first storage 32 in response to the writing of the first target content into the second storage 33.

That is, the first target content is erased from the first storage 32 regardless of whether the first target content is similar to the next oldest content after the first target content. Therefore, the first content-moving unit 432 can increase the size of the free storage area of the first storage 32 by executing the short-term storage content erase process.

Figure 6:
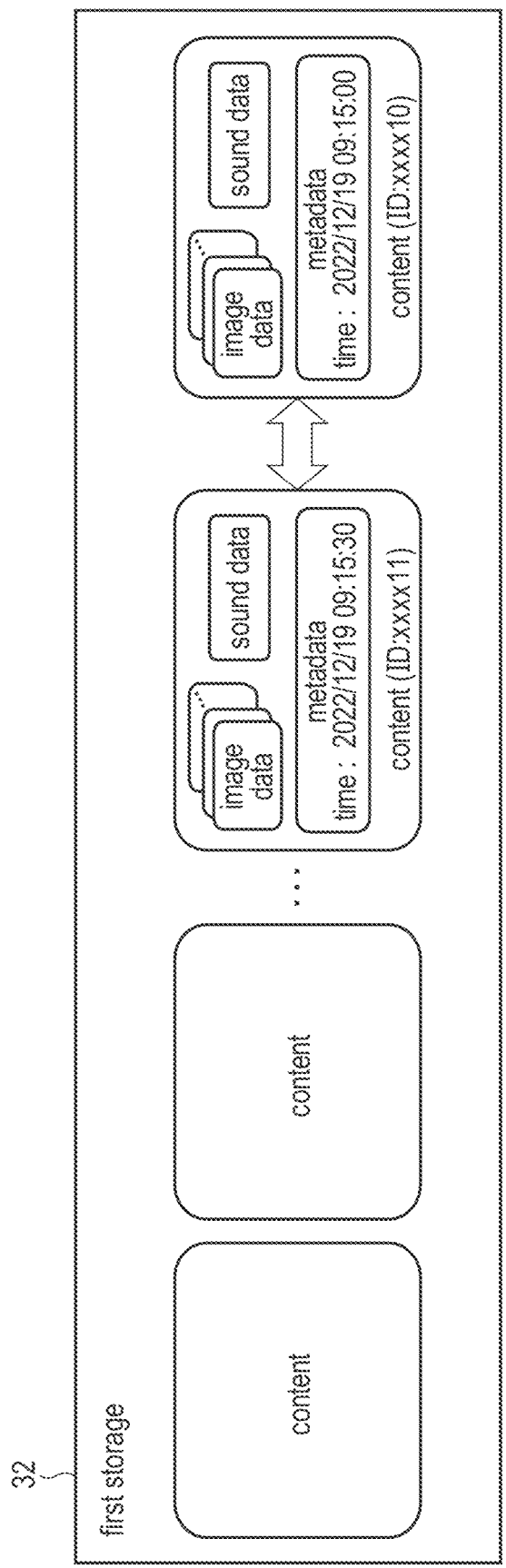
FIG. 6 is a diagram illustrating an example in which pieces of content stored in the first storage are compared in the storage system according to the embodiment.

A more specific description will be given using the example illustrated in FIG. 6. FIG. 6 is a diagram illustrating an example in which pieces of content stored in the first storage 32 are compared. First, the first content-moving unit 432 selects content xxxx10 as the first target content from the content stored in the first storage 32. The content xxxx10 is the oldest content among the pieces of content stored in the first storage 32. The first content-moving unit 432 selects, as the first target content, a content whose time included in the metadata indicates the oldest time among the pieces of content stored in the first storage 32.

Then, the first content-moving unit 432 determines whether content xxxx11, which is the content having the second oldest time among the pieces of content stored in the first storage 32, is similar to the content xxxx10. The content xxxx10 is content obtained by packing the life data acquired between 9:15:00 on Dec. 19, 2022, and 9:15:30 on Dec. 19, 2022, and the content xxxx11 is content obtained by packing the life data acquired between 9:15:30 on Dec. 19, 2022, and 9:16:00 on Dec. 19, 2022. Therefore, the content xxxx10 and the content xxxx11 are temporally continuous content.

When the content xxxx10 is similar to the content xxxx11, the first content-moving unit 432 determines that the redundancy of the content xxxx10 is high. In this case, the first content-moving unit 432 erases the content xxxx10 from the first storage 32.

When the content xxxx10 is not similar to the content xxxx11, the first content-moving unit 432 determines that the redundancy of the content xxxx10 is low. In this case, the first content-moving unit 432 writes the content xxxx10 in the second storage 33. Then, the first content-moving unit 432 erases the content xxxx10 stored in the first storage 32.

When the pieces of content are compared after the content xxxx10 which is the first target content is erased, the first content-moving unit 432 newly selects the content xxxx11 which is the oldest content among the pieces of content stored in the first storage 32 as the first target content. Then, the above-described processing is similarly executed. As a result, when two or more temporally continuous and similar pieces of content are stored in the first storage 32, the first content-moving unit 432 writes only older pieces of content among the two or more pieces of content in the second storage 33. The first content-moving unit 432 repeatedly executes the short-term storage content erase process while the size of the free storage area of the first storage 32 is equal to or smaller than the threshold.

Figure 7:
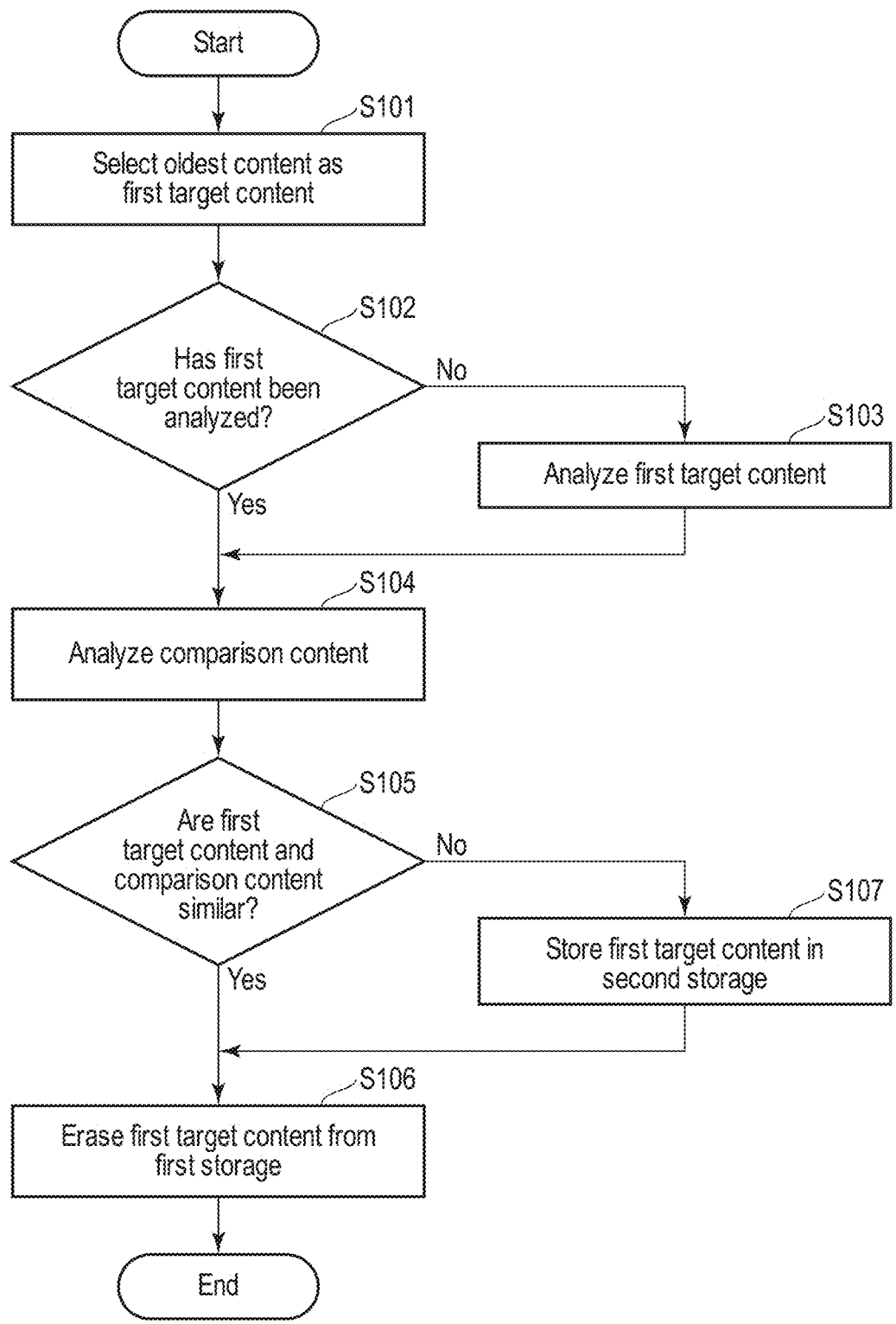
FIG. 7 is a flowchart illustrating an example of a procedure of a short-term storage content erase process executed in the storage system according to the embodiment.

Next, a procedure for the short-term storage content erase process will be described. FIG. 7 is a flowchart illustrating an example of a procedure for the short-term storage content erase process executed in the storage system 3. The short-term storage content erase process is the processing of moving content stored in the first storage 32 to the second storage 33 or erase the content without writing the content in the second storage 33. The first content-moving unit 432 executes the short-term storage content erase process when the size of the free storage area in the first storage 32 in which new data can be stored is equal to or less than the threshold.

First, the first content-moving unit 432 selects the oldest content among the pieces of content stored in the first storage 32 as a first target content (S101). The first content-moving unit 432 selects, for example, content having metadata including time information indicating the oldest time, as the first target content.

The first content-moving unit 432 determines whether the first target content selected in S101 has been analyzed (S102). For example, in a case where the short-term storage content erase process for a content older than the first target content has been executed, feature data associated with the first target content has been acquired since the analysis for the first target content has been executed in the executed short-term storage content erase process. In contrast, for example, in a case where the short-term storage content erase process is executed for the first time, the analysis for the first target content has not been executed, and the feature data associated with the first target content is not acquired yet.

When the first target content is not analyzed yet (No in S102), the first content-processing unit 431 analyzes the first target content (S103). Specifically, the first content-processing unit 431 executes the short-term storage content process that is the processing of acquiring the feature data of the first target content. As a result, the first content-processing unit 431 generates feature data including an object image, a voiceprint, text data, image clustering information, and sound clustering information corresponding to the first target content, and associates the generated feature data with the first target content.

When the first target content has been analyzed (S102: Yes), or after completion of the analysis in S103, the first content-processing unit 431 analyzes content (hereinafter, the content is referred to as comparison content) that is the next oldest content to the first target content among the pieces of content stored in the first storage 32 (S104). Specifically, the first content-processing unit 431 executes the short-term storage content process that is the processing of acquiring feature data of the comparison content. As a result, the first content-processing unit 431 generates feature data including an object image, a voiceprint, text data, image clustering information, and sound clustering information corresponding to the comparison content, and associates the generated feature data with the comparison content.

The first content-moving unit 432 determines whether the first target content and the comparison content are similar to each other (S105). For example, the first content-moving unit 432 compares the feature data associated with the first target content with the feature data associated with the comparison content analyzed in S104 to determine whether the first target content is similar to the comparison content.

When the first target content and the comparison content are similar to each other (Yes in S105), the first content-moving unit 432 erases the first target content selected in S101 from the first storage 32 (S106) and ends the short-term storage content erase process.

When the first target content is not similar to the comparison content (No in S105), the first content-moving unit 432 stores the first target content in the write destination SLC block of the second storage 33 (S107). Then, the first content-moving unit 432 erases the first target content selected in S101 from the first storage 32 (S106) and ends the short-term storage content erase process.

In this way, the first content-moving unit 432 can select content stored in the storage system 3 by determining whether to move each of the one or more pieces of content stored in the first storage 32 to the second storage 33. Specifically, when temporally continuous pieces of content are similar, an older piece of content is erased without being written to the second storage 33. In addition, when temporally continuous pieces of content are not similar to each other, the older piece of content is written to the second storage 33 and erased. Therefore, when the temporally continuous pieces of content are similar to each other, the content written to the second storage 33 is the oldest piece of content among the pieces of content. Further, content of the first storage 32 is not written to the third storage 34. As a result, in the storage system 3 of the present embodiment, it is possible to avoid redundant content from being stored in the second storage 33 and the third storage 34, as compared with a case where all pieces of content are unconditionally stored in a nonvolatile memory device. Therefore, the storage areas of the second storage 33 and the third storage 34 can be effectively used.

Figure 8:
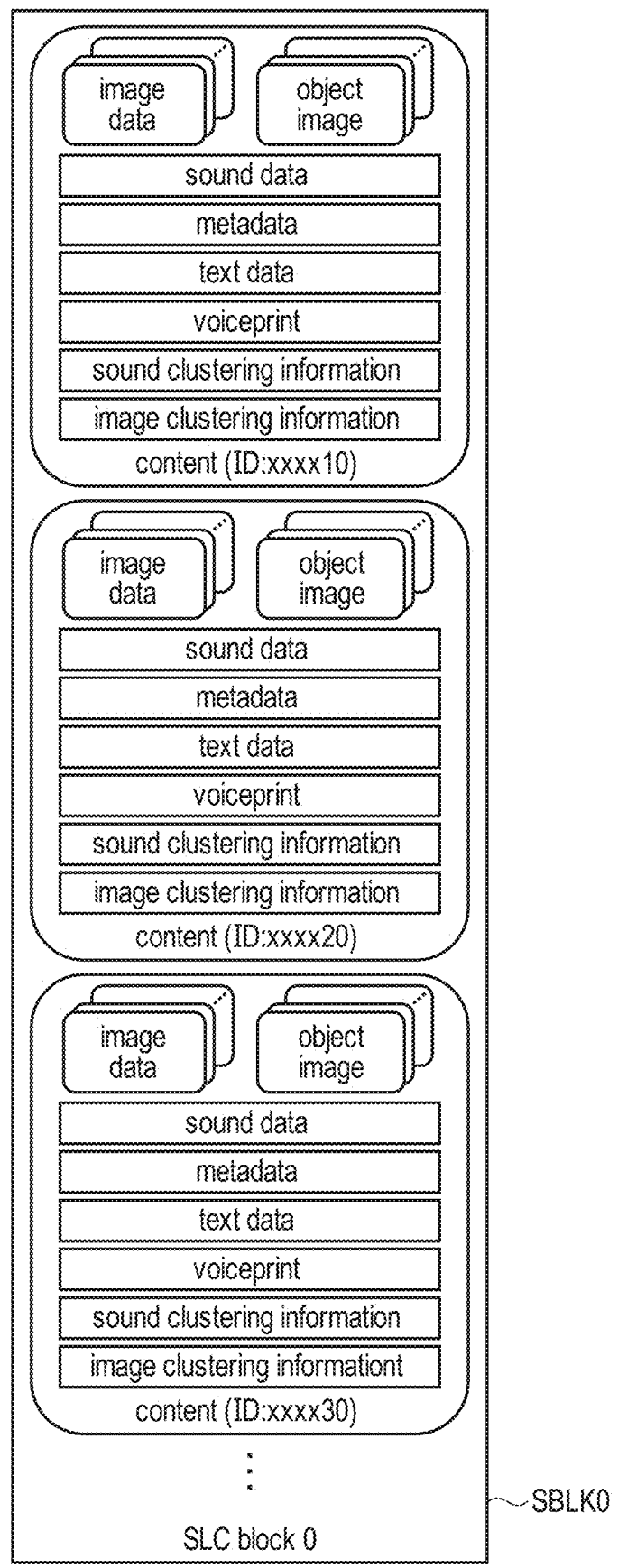
FIG. 8 is a diagram illustrating a configuration example of pieces of content stored in a block in the second storage in the storage system according to the embodiment.

Next, the storage of content in the second storage 33 will be described. FIG. 8 is a diagram illustrating an example of a configuration of content stored in a block in the second storage 33. Here, a case where a plurality of pieces of content is stored in the SLC block SBLK0 in the second storage 33 will be exemplified. Note that other SLC blocks in the second storage 33 can store a plurality of pieces of content in a similar manner.

The content (ID: xxxx10, xxxx20, xxxx30, and so on) stored in the SLC block SBLK0 includes the feature data generated in the short-term storage content process in addition to the life data (that is, image data, sound data, and metadata) received from the first I/F 41. The feature data includes at least one of an object image, a voiceprint, image clustering information, sound clustering information, and text data. The text data includes, for example, an audio text.

The content stored in the SLC block may have a data size of a fixed length.

Next, the movement of content from the SLC block in the second storage 33 to the MLC block in the third storage 34 will be described. The second content-processing unit 433 and the second content-moving unit 434 perform (1) processing of moving content based on a possible storage period and (2) processing of moving content based on an index indicating a free storage area in the second storage 33.

Figure 9:
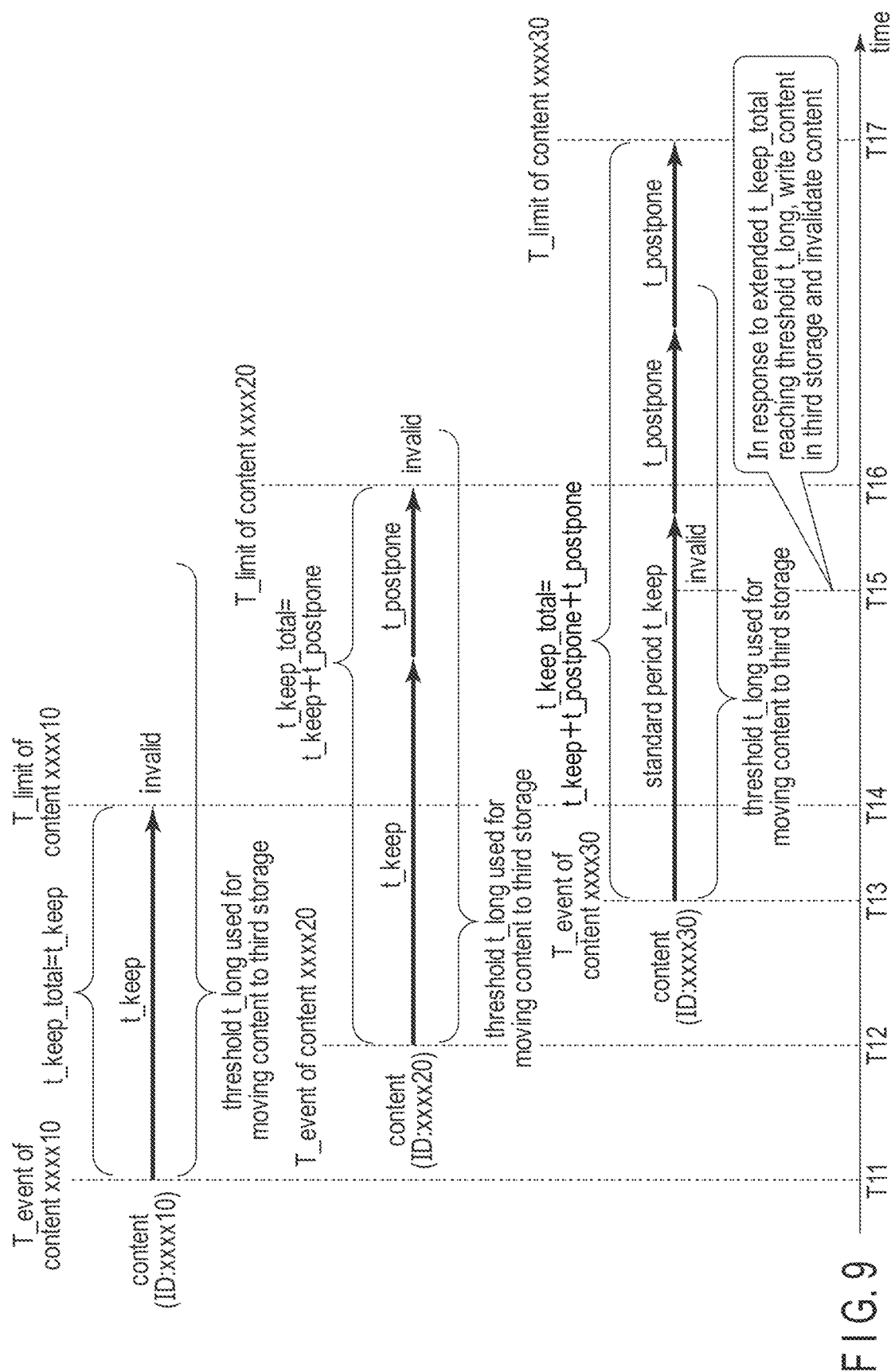
FIG. 9 is a time chart illustrating an example of possible storage periods of pieces of content stored in the second storage in the storage system according to the embodiment.
Figure 11:
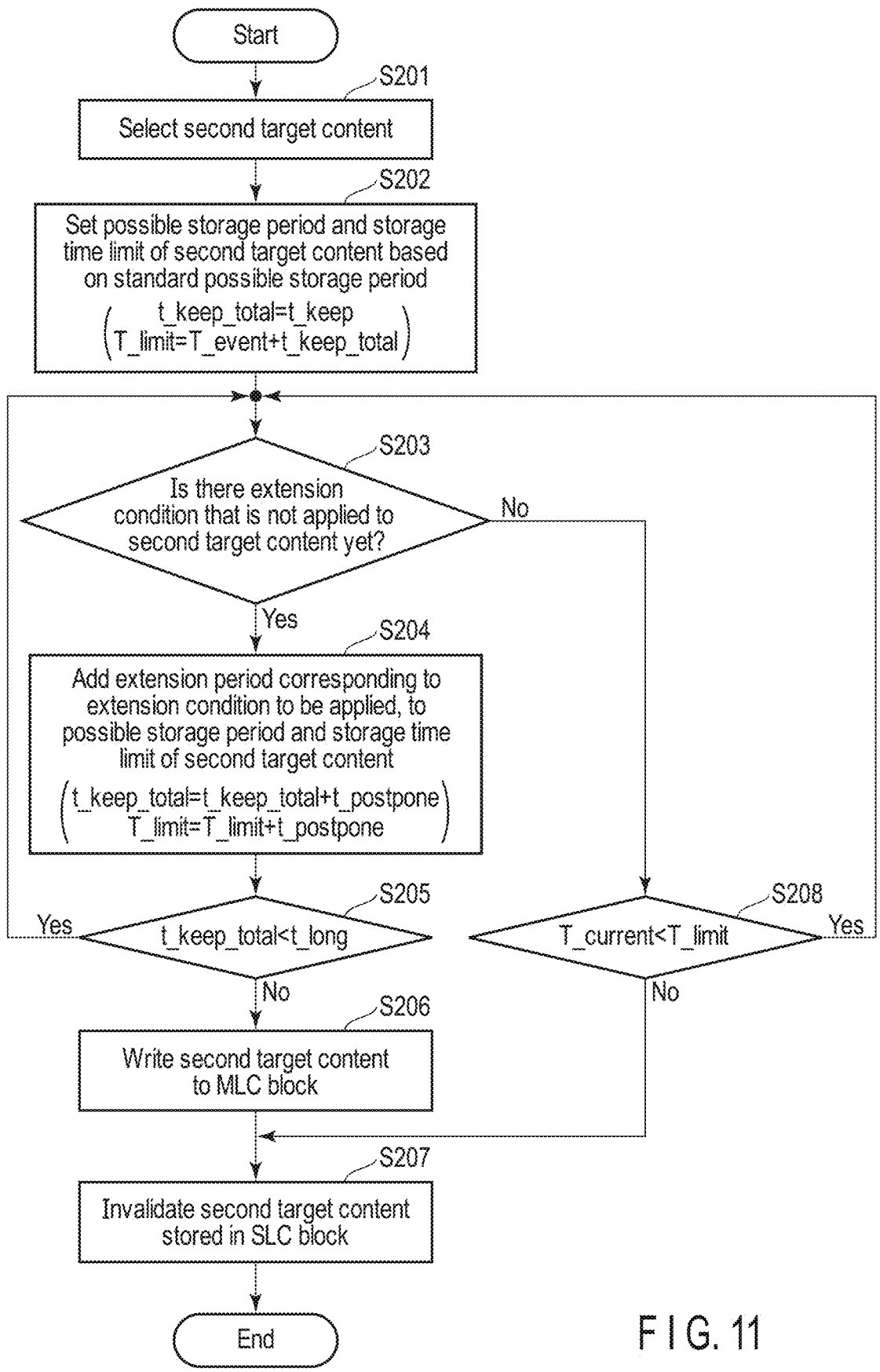
FIG. 11 is a flowchart illustrating an example of a procedure for a middle-term storage content moving process executed in the storage system according to the embodiment.

First, with respect to the content stored in the second storage 33 illustrated in FIG. 8, (1) processing of moving the content based on the possible storage period will be described with reference to FIGS. 9 to 11. FIG. 9 is a time chart illustrating an example of possible storage periods of pieces of content stored in the second storage 33.

A possible storage period t_keep_total is individually set to each piece of content stored in an SLC block. An initial value of the possible storage period t_keep_total is a standard possible storage period t_keep. The standard possible storage period t_keep is determined, for example, based on the setting information 312. The second content-processing unit 433 acquires a storage time limit T_limit of a corresponding content by adding the possible storage period t_keep_total to a storage time T_event of the corresponding content. The storage time T_event is the time at which the corresponding content is stored in the second storage 33. The storage time limit T_limit is a time indicating a time limit by which the corresponding content can be stored in the second storage 33. That is, the content may be stored in the second storage 33 until the current time T_current reaches the storage time limit T_limit corresponding to the content. The second content-processing unit 433 compares the acquired storage time limit T_limit with the current time T_current. When the current time T_current has reached the storage time limit T_limit, the second content-processing unit 433 determines that the possible storage period t_keep_total has expired and invalidates the corresponding content in the second storage 33.

In addition, the second content-processing unit 433 determines whether each of the pieces of content stored in the SLC block satisfies at least one condition among one or more extension conditions. When a piece of content satisfies at least one extension condition among the one or more extension conditions, the second content-processing unit 433 adds an extension period t_postpone that corresponds to the satisfied at least one extension condition, to the possible storage period t_keep_total corresponding to the piece of content.

For example, the one or more extension conditions include: a condition that metadata of the content includes information designated by the setting information 312 (for example, a person, an object, a position, and the like); a condition that the number of times of reading in the metadata of the content exceeds a threshold; a condition that the value of the importance flag in the metadata of the content is one; a condition that the metadata of the content is different from normal metadata; and a condition that the content includes the same text data as the text data in a content newly written to the second storage 33. The extension period t_postpone is different for each extension condition, for example. Note that the extension period t_postpone may be the same for some or all extension conditions. Specifically, for example, when any of parameters included in the metadata is an outlier of 3σ or more, the second content-processing unit 433 determines that the metadata is different from the normal metadata, and determines that the content including the metadata satisfies the extension condition. σ is a standard deviation in a normal distribution of any parameter included in the metadata. In addition, when a piece of content satisfies two or more extension conditions, the second content-processing unit 433 adds two or more extension periods t_postpone respectively corresponding to satisfied the two or more extension conditions, to the possible storage period t_keep_total of the content.

The second content-moving unit 434 determines whether the updated possible storage period t_keep_total has reached a threshold t_long, which is the first threshold. The threshold t_long is a threshold for determining whether to move content to the MLC block in the third storage 34. The threshold t_long is longer than, for example, the standard possible storage period t_keep. The threshold t_long is determined, for example, based on the setting information 312.

When the updated possible storage period t_keep_total has reached the threshold t_long, the second content-moving unit 434 moves the corresponding content to the third storage 34. Specifically, the second content-moving unit 434 writes the content to the third storage 34 and then invalidates the content in the second storage 33.

When the updated possible storage period t_keep_total does not reach the threshold t_long and the possible storage period t_keep_total has not expired, the second content-moving unit 434 keeps the corresponding content stored in the SLC block in the second storage 33.

FIG. 9 illustrates the lapse of time until each of pieces of content xxxx10, xxxx20, and xxxx30 stored in an SLC block is invalidated. Here, a storage time T_event of the content xxxx10 is a time T11. A storage time T_event of the content xxxx20 is a time T12. A storage time T_event of the content xxxx30 is a time T13.

For example, in response to the content xxxx10 being stored in the SLC block (second storage 33), the second content-processing unit 433 sets the standard possible storage period t_keep as a possible storage period t_keep_total of the content xxxx10. In the example shown in FIG. 9, since the content xxxx10 does not satisfy any extension condition, the second content-processing unit 433 does not extend the possible storage period t_keep_total of the content xxxx10. In the example shown in FIG. 9, because the possible storage period t_keep_total corresponding to the content xxxx10 is shorter than the threshold t_long, the second content-processing unit 433 does not move the content xxxx10 to an MLC block (third storage 34). The second content-processing unit 433 determines whether the current time T_current has reached a storage time limit T_limit of the content xxxx10. The storage time limit T_limit of the content xxxx10 is a time T14 obtained by adding the possible storage period t_keep_total (here, the standard possible storage period t_keep) to the storage time T_event (=time T11) of the content xxxx10. Then, the second content-processing unit 433 invalidates the content xxxx10 stored in the SLC block in response to the fact that the current time T_current has reached the time T14, which is the storage time limit T_limit of the content xxxx10.

Further, for example, in response to the content xxxx20 being stored in the SLC block, the second content-processing unit 433 sets the standard possible storage period t_keep as a possible storage period t_keep_total of the content xxxx20. In response to the content xxxx20 satisfying one extension condition, the second content-processing unit 433 adds an extension period t_postpone corresponding to the extension condition to the possible storage period t_keep_total. As a result, the possible storage period t_keep_total corresponding to the content xxxx20 is the sum of the standard possible storage period t_keep and the extension period t_postpone that corresponds to the extension condition. In the example illustrated in FIG. 9, since the possible storage period t_keep_total corresponding to the content xxxx20 is shorter than the threshold t_long, the second content-processing unit 433 does not move the content xxxx20 to the MLC block. In addition, the second content-processing unit 433 determines whether the current time T_current has reached a storage time limit T_limit of the content xxxx20. The storage time limit T_limit of the content xxxx20 is a time T16 obtained by adding the possible storage period t_keep_total (here, the standard possible storage period t_keep+the extension period t_postpone) to the storage time T_event (=T12) of the content xxxx20. The second content-processing unit 433 invalidates the content xxxx20 stored in the SLC block in response to the current time T_current reaching the time T16 that is a storage limit T_limit of the content xxxx20.

Furthermore, for example, in response to the content xxxx30 being stored in the SLC block, the second content-processing unit 433 sets the standard possible storage period t_keep as a possible storage period t_total of the content xxxx30. In response to the content xxxx30 satisfying two extension conditions, the second content-processing unit 433 adds two extension periods t_postpone respectively corresponding to the two extension conditions, to the possible storage period t_keep_total to update the possible storage period t_keep_total. Here, it is assumed that the two extension periods t_postpone corresponding to the two extension conditions have the same value. In this case, the possible storage period t_keep_total corresponding to the content xxxx30 is the sum of the standard possible storage period t_keep and a period obtained by doubling the extension period t_postpone. As a result, a storage time limit T_limit of the content xxxx30 becomes a time T17. In response to the update of the possible storage period t_keep_total of the content xxxx30, the second content-moving unit 434 determines whether the updated possible storage period t_keep_total has reached the threshold t_long. In the example illustrated in FIG. 9, the second content-moving unit 434 writes the content xxxx30 to the MLC block at a time T15 at which it is determined that the possible storage period t_keep_total of the content xxxx30 has reached the threshold t_long (for example, the time at which the possible storage period t_keep_total is updated). Then, the second content-moving unit 434 invalidates the content xxxx30 stored in the SLC block.

For example, the second content-moving unit 434 manages the storage of the content in the second storage 33 using the storage management table 311. FIG. 10 illustrates an example of a configuration of the storage management table 311.

The storage management table 311 includes a plurality of entries respectively corresponding to a plurality of pieces of content. Each of the plurality of entries is generated, for example, in response to the corresponding content being stored in the SLC block (second storage 33), and is added to the storage management table 311. In addition, each of the plurality of entries is deleted from the storage management table 311, for example, in response to the corresponding content being invalidated in the SLC block. Each of the plurality of entries includes an identifier (ID) field, a possible storage period field, a storage time limit field, and a status field.

The identifier (ID) field indicates an ID of the corresponding content.

The possible storage period field indicates a possible storage period t_keep_total of the corresponding content. The second content-moving unit 434 determines whether the possible storage period t_keep_total of the corresponding content is equal to or longer than the threshold t_long for writing the content in the MLC block, with reference to the possible storage period field.

The storage time limit field indicates a storage time limit T_limit (=storage time T_event+possible storage period t_keep_total) of the corresponding content. The second content-moving unit 434 determines whether the current time T_current has reached the storage time limit T_limit, with reference to the storage time limit field.

The status field indicates the state of the corresponding content. When the possible storage period t_keep_total of the corresponding content is less than the threshold t_long and the current time T_current has reached the storage time limit T_limit, for example, "invalid" indicating that the content is invalidated in the SLC block is set in the status field. When the possible storage period t_keep_total of the corresponding content is less than the threshold t_long and the current time T_current does not reach the storage time limit T_limit, for example, "continuance" indicating that the storage of the content in the SLC block is maintained is set in the status field. When the possible storage period t_keep_total of the corresponding content is equal to or more than the threshold t_long and the current time T_current does not reach the storage time limit T_limit, for example, "to be moved" indicating that the content is moved from the SLC block to the MLC block is set in the status field.

FIG. 10 illustrates the state of the storage management table 311 at time T15 when the storage of the pieces of content xxxx10, xxxx20, and xxxx30 described above with reference to FIG. 9 is managed.

First, the entry corresponding to the content xxxx10 will be described.

In the entry corresponding to the content xxxx10, the ID field indicates the ID of the content xxxx10.

The possible storage period field indicates a possible storage period t_keep_total 10 of the content xxxx10. The second content-moving unit 434 determines that the possible storage period t_keep_total 10 is less than the threshold t_long. This is because the possible storage period t_keep_total 10 of the content xxxx10 is not extended, and the possible storage period t_keep_total_10 is equal to the standard possible storage period t_keep.

The storage time limit field indicates a storage time limit T_limit_10 of the content xxxx10. The second content-moving unit 434 determines that the current time T_current (here, time T15) has reached the storage time limit T_limit_10.

The status field indicates invalid. This is because the content xxxx10 stored in the SLC block is invalidated at time T14 before time T15.

Note that, although the case where the information of the entry corresponding to the content xxxx10 remains in the storage management table 311 at the time T15 is described here, the entry corresponding to the content xxxx10 may be deleted from the storage management table 311 after the status field is set to invalid or after the content xxxx10 is invalidated in the SLC block.

Next, the entry corresponding to the content xxxx20 will be described.

In the entry corresponding to the content xxxx20, the ID field indicates the ID of the content xxxx20.

The possible storage period field indicates a possible storage period t_keep_total 20 of the content xxxx20. The second content-moving unit 434 determines that the possible storage period t_keep_total 20 is less than the threshold t_long. This is because the possible storage period t_keep_total of the content xxxx20 has been extended once, but has not yet reached the threshold t_long.

The storage time limit field indicates a storage time limit T_limit_20 of the content xxxx20. The second content-moving unit 434 determines that the current time T_current (here, time T15) does not reach the storage time limit T_limit_20.

The status field indicates continuance. This indicates that, at time T15, the content xxxx20 is maintained in a valid state that it can be read from the SLC block.

Next, the entry corresponding to the content xxxx30 will be described.

In the entry corresponding to the content xxxx30, the ID field indicates the ID of the content xxxx30.

The possible storage period field indicates a possible storage period t_keep_total_30 of the content xxxx30. The second content-moving unit 434 determines that the possible storage period t_keep_total_30 is equal to or longer than the threshold t_long. This is because the possible storage period t_keep_total of the content xxxx30 is extended and reaches the threshold t_long in accordance with the content xxxx30 satisfying the two extension conditions.

The storage time limit field indicates a storage time limit T_limit_30 of the content xxxx30. The second content-moving unit 434 determines that the current time T_current (here, time T15) does not reach the storage time limit T_limit_30.

The status field indicates "to be moved". This is because it is determined at time T15 that the content xxxx30 is content to be moved from the SLC block to the MLC block.

Note that, although the case where the information of the entry corresponding to the content xxxx30 remains in the storage management table 311 at the time T15 is described here, the entry corresponding to the content xxxx30 may be deleted from the storage management table 311 after the content xxxx30 is moved from the SLC block to the MLC block.

Next, a procedure for the middle-term storage content moving process will be described. FIG. 11 is a flowchart illustrating an example of a procedure for the middle-term storage content moving process executed in the storage system 3. The middle-term storage content moving process is a process of moving content stored in the second storage 33 to the third storage 34. For example, the second content-processing unit 433 and the second content-moving unit 434 execute the middle-term storage content moving process in response to the new content being written in the second storage 33. Alternatively, the second content-processing unit 433 and the second content-moving unit 434 may periodically circulate the content stored in the second storage 33 and execute the middle-term storage content moving process.

First, the second content-processing unit 433 selects the content newly written in the SLC block in the second storage 33 as the second target content (S201). Alternatively, the second content-processing unit 433 may select the second target content among the pieces of content newly stored in the second storage 33 after the previous middle-term storage content moving process.

The second content-processing unit 433 sets the possible storage period t_keep_total and the storage time limit T_limit of the second target content based on the standard possible storage period t_keep included in the setting information 312 and the time T_event at which the second target content is stored in the second storage 33 (S202). Specifically, the second content-processing unit 433 sets the standard possible storage period t_keep as the possible storage period t_keep_total of the second target content. Then, the second content-processing unit 433 sets a time obtained by adding the possible storage period t_keep_total of the second target content to the time T_event at which the second target content is stored in the second storage 33 as the storage time limit T_limit of the second target content. Furthermore, the storage time T_event corresponding to each piece of content may be recorded in the storage management table 311, for example, when the content is selected as the second target content for the first time, or when the content is stored in the second storage 33.

The second content-processing unit 433 determines whether there is an extension condition not yet applied to the second target content (S203). That is, the second content-processing unit 433 determines whether the second target content newly satisfies at least one extension condition among the one or more extension conditions.

When there is an extension condition not yet applied to the second target content (Yes in S203), the second content-processing unit 433 adds the extension period t_postpone corresponding to the extension condition not yet applied to each of the possible storage period t_keep_total and the storage time limit T_limit of the second target content (S204). That is, the second content-processing unit 433 adds the extension period t_postpone corresponding to the non-applied extension condition to the possible storage period t_keep_total of the second target content. In addition, the second content-processing unit 433 adds the extension period t_postpone corresponding to the non-applied extension condition to the storage time limit T_limit of the second target content.

Then, the second content-moving unit 434 determines whether the possible storage period t_keep_total updated in S204 is less than the threshold t_long (S205).

When the possible storage period t_keep_total is equal to or larger than the threshold t_long (No in S205), the second content-moving unit 434 writes the second target content in the write destination MLC block of the third storage 34 (S206). At this time, for example, the second content-moving unit 434 updates the information set in the status field to the "to be moved" in the entry of the storage management table 311 corresponding to the second target content.

Next, the second content-moving unit 434 invalidates the second target content stored in the SLC block (S207). At this time, for example, the second content-moving unit 434 updates the information set in the status field to invalid in the entry of the storage management table 311 corresponding to the second target content.

Further, when the possible storage period t_keep_total is less than the threshold t_long (Yes in S205), the second content-processing unit 433 determines again whether there is an extension condition not yet applied to the second target content (S203). When the middle-term storage content moving process is periodically executed, the second content-processing unit 433 may end the middle-term storage content moving process when the possible storage period t_keep_total is less than the threshold t_long (Yes in S205).

When there is no extension condition not yet applied to the second target content (No in S203), the second content-processing unit 433 determines whether the current time T_current is a time before the storage time limit T_limit of the second target content (S208).

When the current time T_current is the time before the storage time limit T_limit (Yes in S208), the second content-processing unit 433 again determines whether there is an extension condition that has not been applied to the second target content (S203). In the case where the middle-term storage content moving process is periodically performed, the second content-processing unit 433 may end the middle-term storage content moving process in the case where the current time T_current is the time before the storage limit T_limit (Yes in S208).

When the current time T_current is the time after the storage time limit T_limit (No in S208), the second content-processing unit 433 invalidates the second target content stored in the SLC block (S207). At that time, for example, the second content-processing unit 433 updates the information set in the status field to invalid in the entry of the storage management table 311 corresponding to the second target content.

Through the above-described middle-term storage content moving process, the second content-processing unit 433 and the second content-moving unit 434 can move the content from the second storage 33 (SLC block) to the third storage 34 (MLC block) based on the possible storage period.

Figure 12:
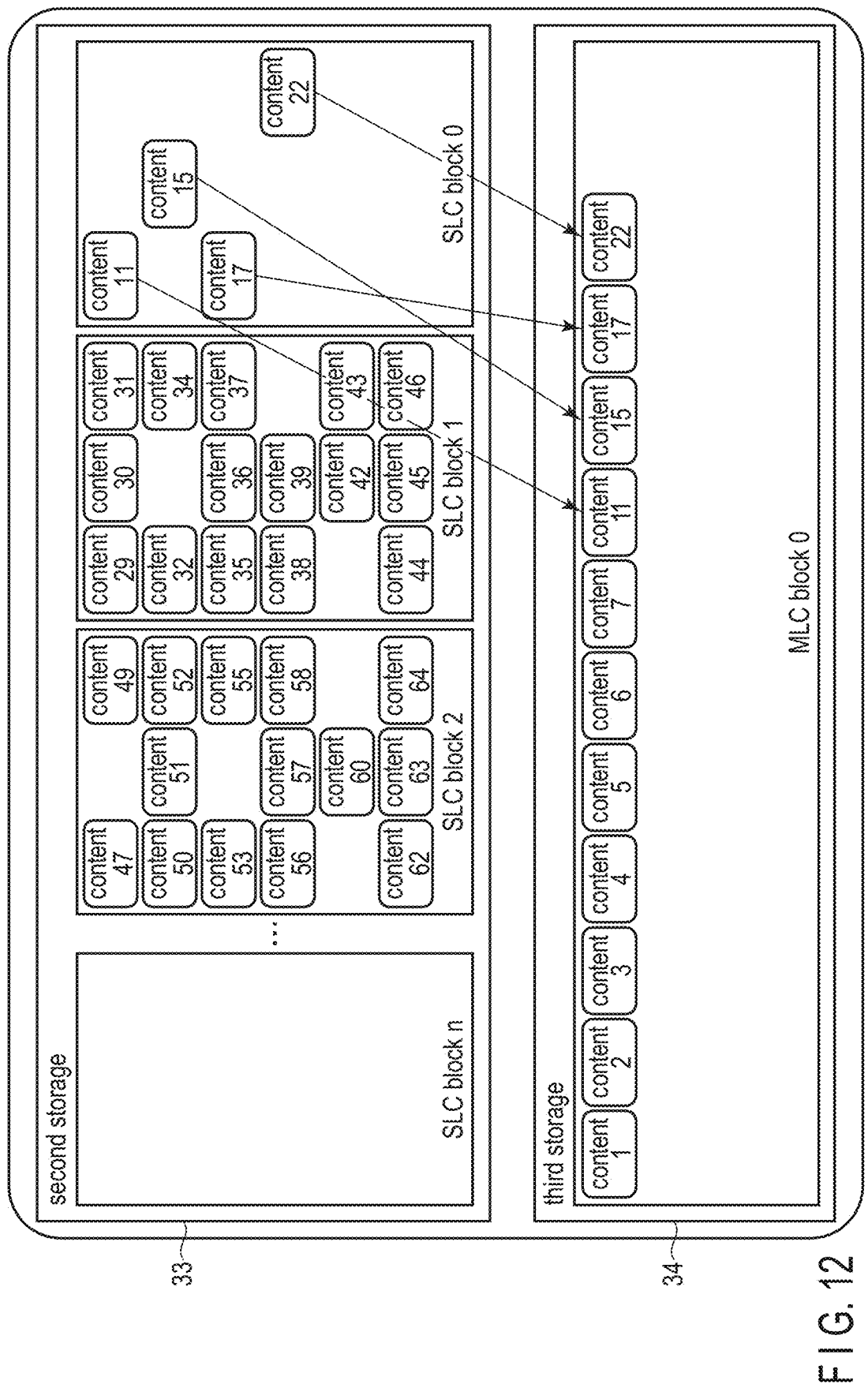
FIG. 12 is a diagram illustrating an example in which pieces of content are moved from the second storage to the third storage in the storage system according to the embodiment.

Next, (2) processing of moving content based on the index indicating the free storage area of the second storage 33 will be described. FIG. 12 is a diagram illustrating an example in which content is moved from the second storage 33 to the third storage 34.

The second content-moving unit 434 selects the block (SLC block) in which the time when the writing of the data is started is the oldest among the active blocks of the second storage 33 in response to the index indicating the free storage area in the second storage 33 in which the data can be newly stored being equal to or less than the second threshold. This block is referred to as, for example, a third block. The index indicating the free storage area in the second storage 33 in which the data can be newly stored is, for example, the size of the free storage area in the second storage 33 in which the data can be newly stored or the number of free blocks registered in the SLC FB list 314. The second content-moving unit 434 writes all the pieces of content which are stored in the third block and not invalidated, to the third storage 34. That is, the second content-moving unit 434 selects only valid content among the pieces of content stored in the third block and writes the selected content in the third storage 34. In response to the completion of writing of all the valid pieces of content in the third block to the third storage 34, the second content-moving unit 434 invalidates all the valid pieces of content in the third block. As a result, the third block becomes a free block that does not include valid content. The second content-moving unit 434 registers the third block in the SLC FB list 314.

FIG. 12 illustrates an example in which, when the second storage 33 includes a plurality of SLC blocks 0, 1, 2, . . . , n, writing of data is started in the order of the SLC block 0, the SLC block 1, the SLC block 2, and so on. In addition, it is assumed that the write destination MLC block in the third storage 34 is the MLC block 0.

In response to the number of free blocks registered in the SLC FB list 314 being equal to or smaller than the second threshold, the second content-moving unit 434 selects the block (here, the SLC block 0) having the oldest data writing start time from among the SLC blocks 0, 1, 2, . . . , n included in the second storage 33.

The second content-moving unit 434 writes the pieces of content 11, 15, 17, and 22 stored in the selected SLC block 0 to the write destination MLC block 0. The pieces of content 11, 15, 17, and 22 are valid pieces of content (that is, content that has not been invalidated) stored in the SLC block 0. Content that is invalidated after being stored in the SLC block 0 is not shown in FIG. 12. The invalidated content in the SLC block 0 is not read from the SLC block 0 and thus is not written to the MLC block 0.

When the operation of writing all the valid pieces of content stored in the SLC block 0 to the MLC block 0 is completed, the second content-moving unit 434 invalidates all the valid pieces of content stored in the SLC block 0. As a result, the SLC block 0 becomes a free block that does not store valid content. Therefore, the CPU 43 releases the registration of the SLC block 0 in the SLC AB list 313. Then, the CPU 43 registers the SLC block 0 in the SLC FB list 314.

Therefore, the second content-moving unit 434 can increase the number of free blocks registered in the SLC FB list 314 by the processing of moving the content based on the index indicating the free storage area of the second storage 33. That is, the second content-moving unit 434 can increase the size of the free storage area in the second storage 33 in which the data can be newly stored.

Figures 13A, 13B:
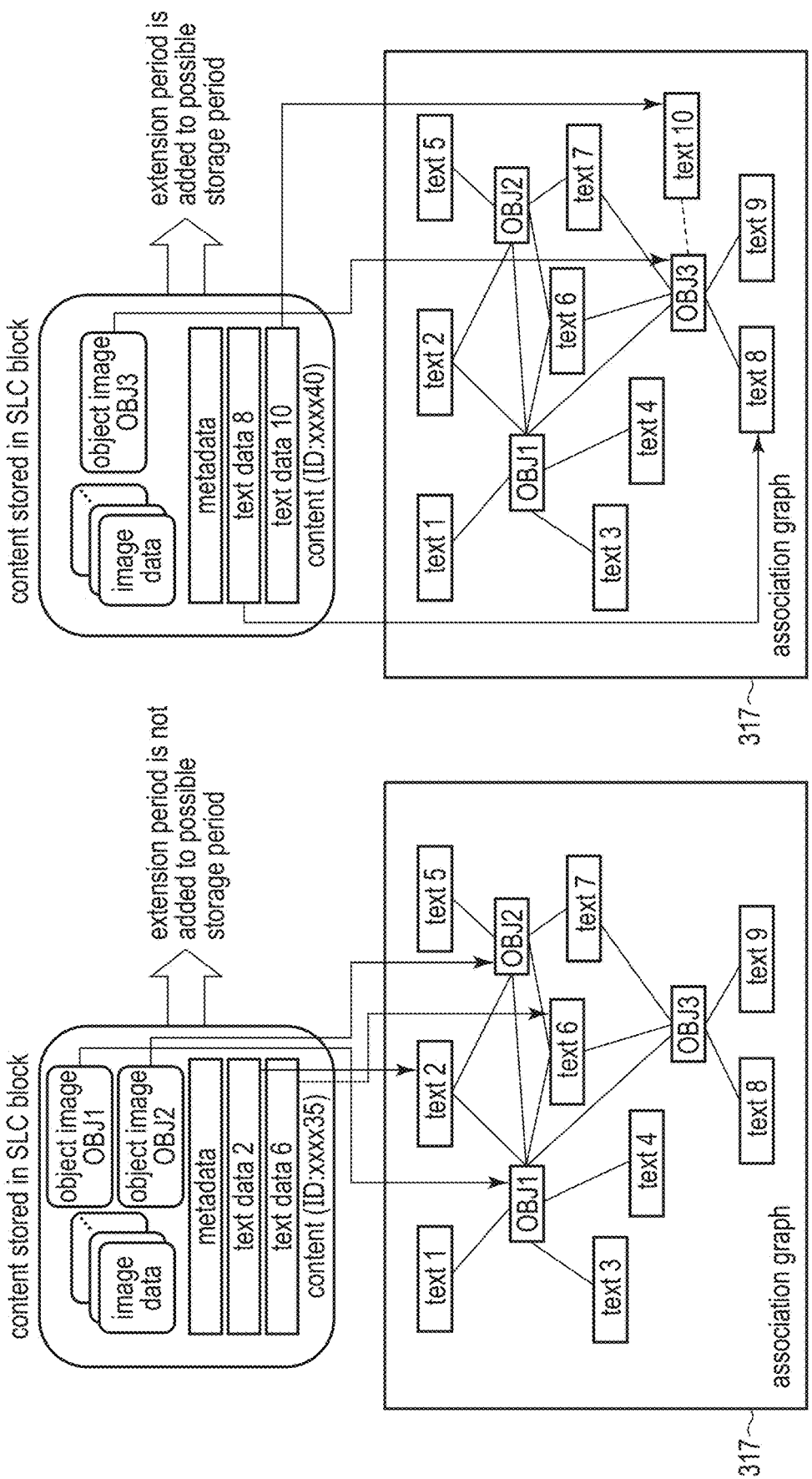
FIG. 13A is a diagram illustrating an example of content by which a new association is not added to an association graph, in the storage system according to the embodiment.
FIG. 13B is a diagram illustrating an example of content by which the new association is added to the association graph, in the storage system according to the embodiment.

Next, a case where the association graph 317 is generated by the third content-processing unit 435 will be described. The association graph 317 indicates an association between the pieces of content stored in the third storage 34. When the association graph 317 is used by the second content-processing unit 433 as one of extension conditions of the possible storage period t_keep_total, the third content-processing unit 435 generates the association graph 317. When the content stored in the second storage 33 is a content to which the new association is to be added to the association graph 317, the second content-processing unit 433 extends the possible storage period t_keep_total of the content. FIGS. 13A and 13B are diagrams, respectively, illustrating an example of content for which a new association is not added to the association graph 317 and an example of content for which the new association is added to the association graph 317 in the storage system 3.

The association graph 317 manages the association between the object image and the text data included in each piece of content stored in the third storage 34. The association in the association graph 317 includes, for example, an association between an object image and text data and an association between two object images. For example, when one piece of content stored in the third storage 34 includes the object image OBJ1 and text 1, information indicating that the object image OBJ1 and text 1 are associated with each other is stored in the association graph 317.

In the association graphs 317 illustrated in FIGS. 13A and 13B, an object image OBJ1 is associated with a text 1, a text 2, a text 3, a text 4, a text 6, an object image OBJ2, and an object image OBJ3. The object image OBJ2 is associated with the text 2, a text 5, the text 6, a text 7, and the object image OBJ1. The object image OBJ3 is associated with the text 6, the text 7, a text 8, a text 9, and the object image OBJ1.

Content xxxx35 illustrated in FIG. 13A includes the object image OBJ1, the object image OBJ2, the text 2, and the text 6. The content xxxx35 is content that does not add a new association to the association graph 317. Specifically, the association between the object image OBJ1 and the object image OBJ2, the association between the object image OBJ1 and the text 2, the association between the object image OBJ1 and the text 6, the association between the object image OBJ2 and the text 2, and the association between the object image OBJ2 and the text 6 are all already included in the association graph 317. Thus, the content xxxx35 is content that does not add any association to the association graph 317. That is, even if the content xxxx35 is moved from the SLC block of the second storage 33 to the MLC block of the third storage 34, a new association is not added to the association graph 317.

Content xxxx40 illustrated in FIG. 13B includes the object image OBJ3, the text 8, and a text 10. The content xxxx40 is content for adding a new association to the association graph 317. Specifically, the association between the object image OBJ3 and the text 8 is already included in the association graph 317, but the association between the object image OBJ3 and the text 10 is not yet included in the association graph 317. Therefore, the content xxxx40 is content that newly adds an association between the object image OBJ3 and the text 10 to the association graph 317. That is, when the content xxxx40 is moved from the SLC block of the second storage 33 to the third storage 34, the association between the object image OBJ3 and the text 10 is newly added to the association graph 317.

The second content-processing unit 433 uses the fact that the content stored in the second storage 33 is content for adding a new association to the association graph 317 as an extension condition regarding the association graph 317. In the example shown in FIG. 13, the second content-processing unit 433 adds the extension period t_postpone corresponding to the extension condition to the possible storage period t_keep_total of the content xxxx40 that satisfies the extension condition related to the association graph 317. On the other hand, the second content-processing unit 433 does not add the extension period t_postpone corresponding to the extension condition to the possible storage period t_keep_total of the content xxxx35 that does not satisfy the extension condition related to the association graph 317.

As described above, for example, the association graph 317 generated by the third content-processing unit 435 can be used as the extension condition for extending the possible storage period t_keep_total.

As described above, according to the embodiment, the controller 4 manages each of the possible storage periods t_keep_total corresponding to each piece of content stored in the second storage 33. When the current time T_current has reached the storage time limit T_limit corresponding to one piece of content, the controller 4 invalidates the content. When a certain piece of content stored in the second storage 33 satisfies at least one extension condition among one or more extension conditions, the controller 4 adds the extension period t_postpone corresponding to the satisfied extension condition to the possible storage period t_keep_total corresponding to the content. When the possible storage period t_keep_total is equal to or larger than the first threshold t_long, the controller 4 writes the content corresponding to the possible storage period t_keep_total in the third storage 34.

The controller 4 extends the possible storage period t_keep_total of the content satisfying the set extension condition. Then, the content in which the possible storage period t_keep_total is updated to the first threshold t_long or more can be moved to the third storage 34. Therefore, the controller 4 can preferentially extend the possible storage period t_keep_total of the important content by setting an extension condition that is satisfied by the important content. As a result, the controller 4 can preferentially move important content to the third storage 34.

In addition, the controller 4 can also set an extension condition so that the possible storage period t_keep_total of unnecessary content is unlikely to be extended. As a result, the controller 4 can avoid the storage areas of the second storage 33 and the third storage 34 from being used for a long period of time due to unnecessary content.

In addition, the oldest content among the pieces of content stored in the first storage 32 is selected as the first target content, and it is determined whether the first target content is similar to the comparison content which is the next oldest content after the first target content among the pieces of content stored in the first storage 32. When the first target content is similar to the comparison content, the controller 4 erases the first target content. When the first target content is not similar to the comparison content, the controller 4 writes the first target content in the second storage 33.

That is, the controller 4 determines that a group of temporally continuous and similar content is a group of highly redundant content, and erases content other than the latest content.

As a result, the controller 4 can avoid the storage areas of the second storage 33 and the third storage 34 of the storage system 3 from being used by the highly redundant content. That is, the storage areas of the storage system 3 having limited resources can be effectively used.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A storage system comprising:
one or more nonvolatile memories each including a plurality of blocks, each of the plurality of blocks being a unit of an erase operation; and
a controller configured to manage, when one or more data portions are stored in one or more first blocks among the plurality of blocks, one or more storage time periods for which the one or more data portions are to be stored, respectively, in respective corresponding blocks of the one or more first blocks, wherein
the controller is configured to:
in response to determining that a first storage time period corresponding to a first data portion among the one or more data portions is equal to or more than a first time threshold in the one or more storage time periods, write the first data portion to one or more second blocks of the blocks that is different from the one or more first blocks and invalidate the first data portion stored in the one or more first blocks; and
in response to determining that the first storage time period is less than the first time threshold and a time period for which the first data portion is stored in the one or more first blocks has become longer than or equal to the first storage time period, invalidate the first data portion stored in the one or more first blocks.

2. The storage system according to claim 1, wherein
the controller is configured to:
in response to determining that i) the first data portion satisfies at least one condition among one or more conditions, ii) the first storage time period is less than the first time threshold and iii) before the time period in which the first data portion is stored in the one or more first blocks becomes longer than or equal to the first storage time period, add a first time period corresponding to the satisfied at least one condition to the first storage time period;
in response to determining that the first storage time period to which the first time period is added has become longer than or equal to the first time threshold, write the first data portion to the one or more second blocks and invalidate the first data portion stored in the one or more first blocks; and
in response to determining that i) the first storage time period to which the first time period is added is shorter than the first time threshold and ii) the time period for which the first data portion is stored in the one or more first blocks has become longer than or equal to the first storage time period, invalidate the first data portion stored in the one or more first blocks.

3. The storage system according to claim 2, wherein
the one or more conditions include a first condition and a second condition,
the first condition corresponds to the first time period,
the second condition corresponds to a second time period, and
the controller is configured to:
add the first time period to the first storage time period based on the first data portion satisfying the first condition; and
add the second time period to the first storage time period based on the first data portion satisfying the second condition.

4. The storage system according to claim 1, wherein
the controller is configured to:
in response to an index indicating a free storage area in the one or more first blocks that is capable of storing data being equal to or less than a second size threshold, write all data portions that are not invalidated and which are stored in a third block to which data writing is oldest among the one or more first blocks, to the one or more second blocks; and
invalidate the all data portions stored in the third block.

5. The storage system according to claim 1, further comprising:
a volatile memory configured to temporarily store a plurality of data portions, wherein the controller is configured to:

determine whether a second data portion that is an oldest data portion among a plurality of data portions stored in the volatile memory is similar to a third data portion that is a second oldest data portion among the plurality of data portions, based on first information indicating a feature of the second data portion and second information indicating a feature of the third data portion;

store the second data portion in any one block of the one or more first blocks and erase the second data portion from the volatile memory when the second data portion and the third data portion are not similar to each other; and erase the second data portion from the volatile memory when the second data portion and the third data portion are similar to each other.

6. The storage system according to claim 1, wherein each of the one or more data portions includes at least one of image data, sound data, and metadata.

7. The storage system according to claim 6, further comprising:

a first interface configured to receive the at least one of image data, sound data, and metadata from at least one device.

8. The storage system according to claim 1, further comprising:

a second interface configured to receive setting information from an external apparatus, wherein the setting information includes an initial value of each of the one or more storage time periods or the first time threshold.

9. The storage system according to claim 1, wherein the one or more nonvolatile memories include a first nonvolatile memory including the one or more first blocks and a second nonvolatile memory including the one or more second blocks, or the one or more nonvolatile memories include a nonvolatile memory that includes the one or more first blocks and the one or more second blocks.

10. The storage system according to claim 1, wherein the controller is configured to:

write N-bit data per memory cell to a plurality of memory cells included in the one or more first blocks; and write M-bit data per memory cell to a plurality of memory cells included in the one or more second blocks, N is one or more, and M is larger than N.

11. An information processing system comprising:

a storage system comprising:

one or more nonvolatile memories each including a plurality of blocks, each of the plurality of blocks being a unit of an erase operation;

a controller configured to manage, when one or more data portions are stored in one or more first blocks among the plurality of blocks, one or more storage time periods for which the one or more data portions are to be stored, respectively, in respective corresponding blocks of the one or more first blocks; and a device connected to the storage system and configured to acquire data related to the one or more data portions, wherein the controller is configured to:

in response to determining that a first storage time period corresponding to a first data portion among the one or more data portions is equal to or more than a first time threshold in the one or more storage time periods, write the first data portion to one or more second blocks of the blocks that is different from the one or more first blocks and invalidate the first data portion stored in the one or more first blocks; and in response to determining that the first storage time period is less than the first time threshold and a time period for which the first data portion is stored in the one or more first blocks has become longer than or equal to the first storage time period, invalidate the first data portion stored in the one or more first blocks.

12. The information processing system according to claim 11, wherein the controller is configured to:

in response to determining that i) the first data portion satisfies at least one condition among one or more conditions, ii) the first storage time period is less than the first time threshold and iii) before the time period in which the first data portion is stored in the one or more first blocks becomes longer than or equal to the first storage time period, add a first time period corresponding to the at least satisfied one condition to the first storage time period;

in response to determining that the first storage time period to which the first time period is added has become longer than or equal to the first time threshold, write the first data portion to the one or more second blocks and invalidate the first data portion stored in the one or more first blocks; and in response to determining that i) the first storage time period to which the first time period is added is shorter than the first time threshold and ii) the time period for which the first data portion is stored in the one or more first blocks has become longer than or equal to the first storage time period, invalidate the first data portion stored in the one or more first blocks.

13. The information processing system according to claim 12, wherein the one or more conditions include a first condition and a second condition, the first condition corresponds to the first time period, the second condition corresponds to a second time period, and the controller is configured to:

add the first time period to the first storage time period based on the first data portion satisfying the first condition; and add the second time period to the first storage time period based on the first data portion satisfying the second condition.

14. The information processing system according to claim 11, wherein the controller is configured to:

in response to an index indicating of a free storage area in the one or more first blocks that is capable of storing data being equal to or less than a second size threshold, write all data portions that are not invalidated and which are stored in a third block to which data writing is oldest among the one or more first blocks, to the one or more second blocks; and invalidate the all data portions stored in the third block.

15. The information processing system according to claim 11, further comprising:

a volatile memory configured to temporarily store a plurality of data portions, wherein the controller is configured to:

determine whether an a second data portion that is an oldest data portion among a plurality of data portions stored in the volatile memory is similar to a third data portion that is a second oldest data portion among the plurality of data portion, based on first information indicating a feature of the second data portion and second information indicating a feature of the third data portion;

store the second data portion in any one block of the one or more first blocks and erase the second data portion from the volatile memory when the second data portion and the third data portion are not similar to each other; and erase the second data portion from the volatile memory when the second data portion and the third data portion are similar to each other.

16. The information processing system according to claim 11, wherein
each of the one or more data portions includes at least one of image data, sound data, and metadata.

17. The information processing system according to claim 16, further comprising:
a first interface configured to receive the at least one of image data, sound data, and metadata from at least one device.

18. The information processing system according to claim 11, further comprising:
a second interface configured to receive setting information from an external apparatus, wherein
the setting information includes an initial value of each of the one or more storage time periods or the first time threshold.

19. The information processing system according to claim 11, wherein
the one or more nonvolatile memories include a first nonvolatile memory including the one or more first blocks and a second nonvolatile memory including the one or more second blocks, or
the one or more nonvolatile memories include a nonvolatile memory including the one or more first blocks and the one or more second blocks.

20. The information processing system according to claim 11, wherein
the controller is configured to:
write N-bit data per memory cell to a plurality of memory cells included in the one or more first blocks; and
write M-bit data per memory cell to a plurality of memory cells included in the one or more second blocks,
the N is 1 or more, and
the M is larger than the N.

* * * * *